(12) United States Patent
Sasaki

(10) Patent No.: US 6,560,068 B1
(45) Date of Patent: May 6, 2003

(54) THIN-FILM MAGNETIC HEAD INCLUDING TWO STACKED POLE PORTION LAYERS OF EQUAL WIDTHS, AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 140 days.

(21) Appl. No.: 09/583,728

(22) Filed: May 31, 2000

(30) Foreign Application Priority Data

Jun. 4, 1999 (JP) .......................................... 11-158125
Apr. 20, 2000 (JP) ....................................... 2000-119217

(51) Int. Cl.[7] .............................................. G11B 5/147
(52) U.S. Cl. ....................................................... 360/126
(58) Field of Search .................................. 360/126, 317

(56) References Cited

U.S. PATENT DOCUMENTS 5,438,747 A    8/1995   Krounbi et al. ........... 29/603.01
6,301,076 B1 * 10/2001  Stageberg et al. ........... 360/126

FOREIGN PATENT DOCUMENTS

JP    A-60-10409    1/1985
JP    A-62-245509   10/1987
JP    A-7-262519    10/1995

* cited by examiner

*Primary Examiner*—David Davis
(74) *Attorney, Agent, or Firm*—Oliff & Berridge, PLC

(57) ABSTRACT

The invention allows a track width and a throat height of an induction-type magnetic transducer to be defined with accuracy even if the track width is reduced. A recording head has a bottom pole layer and a top pole layer that include pole portions opposed to each other, a recording gap layer being placed between the pole portions. The recording head further has a thin-film coil. The top pole layer includes first and second pole portion layers and a yoke portion layer. The first pole portion layer has a width equal to the recording track with and a length equal to the throat height. The width of a portion of the second pole portion layer touching the first pole portion layer is equal to the width of the first pole portion layer, that is, the recording track width. The entire length of the second pole portion layer is greater than the first pole portion layer. The first pole portion layer is first formed to have a width greater than the recording track width. The first pole portion layer is then etched with the second pole portion layer as a mask and made to have a width equal to the recording track width.

33 Claims, 18 Drawing Sheets

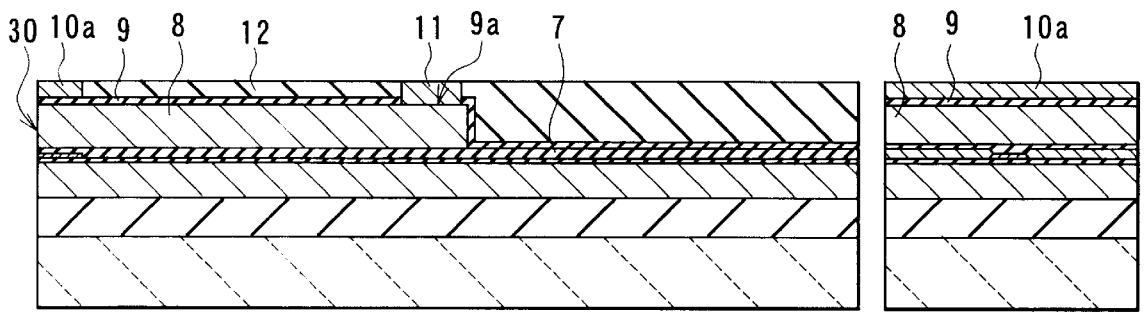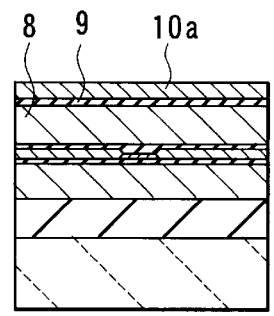
FIG. 3A  FIG. 3B
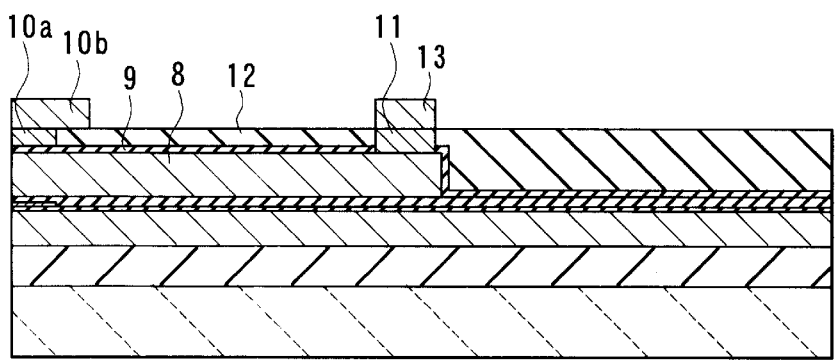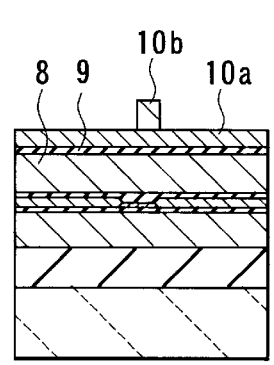
FIG. 4A  FIG. 4B

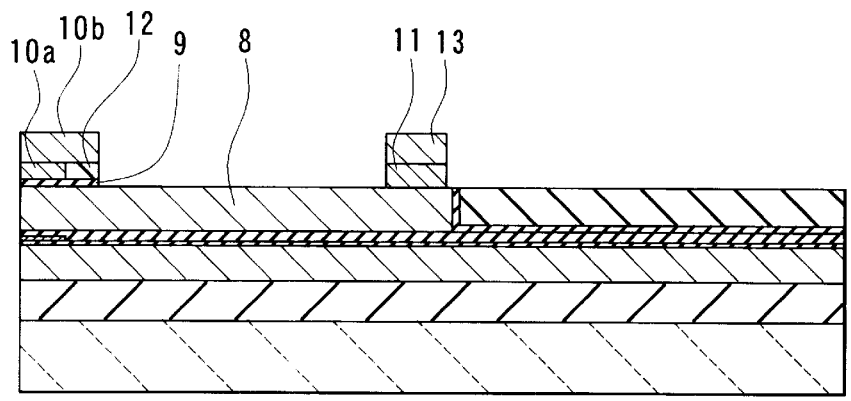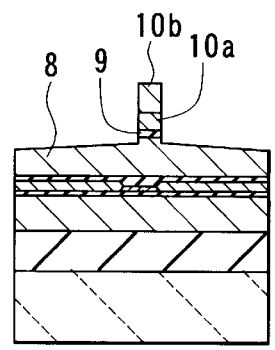
FIG. 5A     FIG. 5B
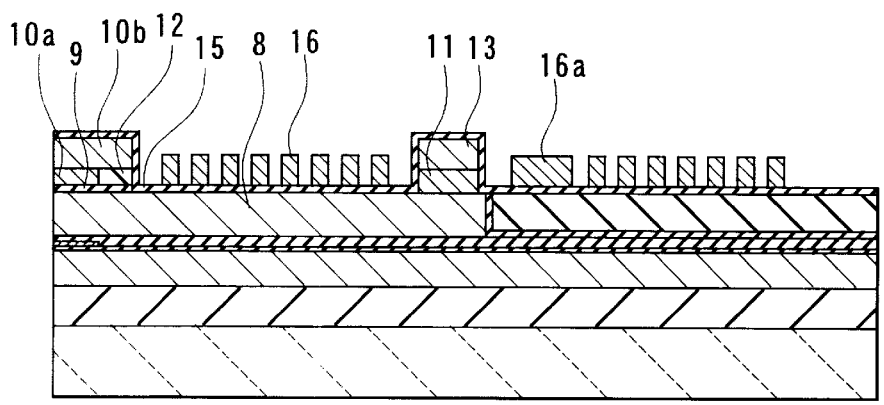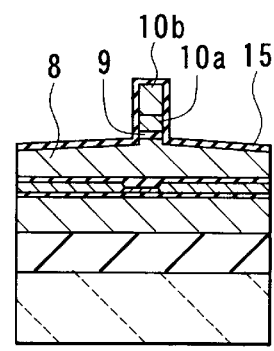
FIG. 6A     FIG. 6B

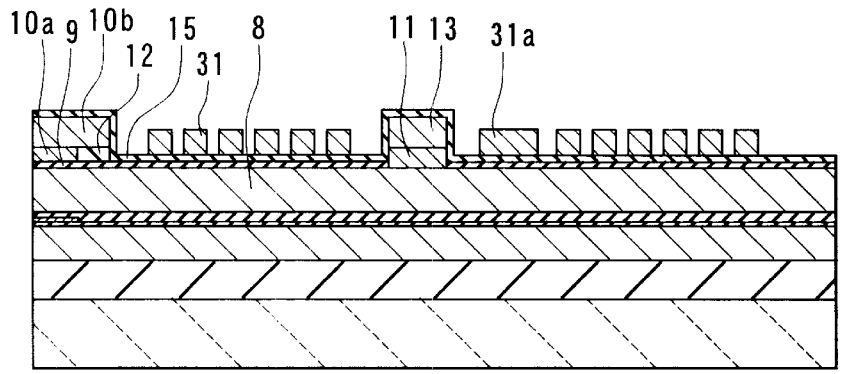
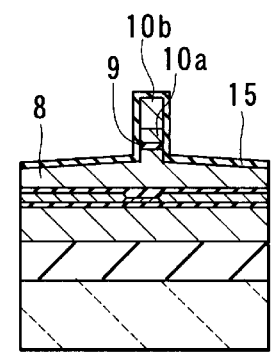
FIG. 16A FIG. 16B
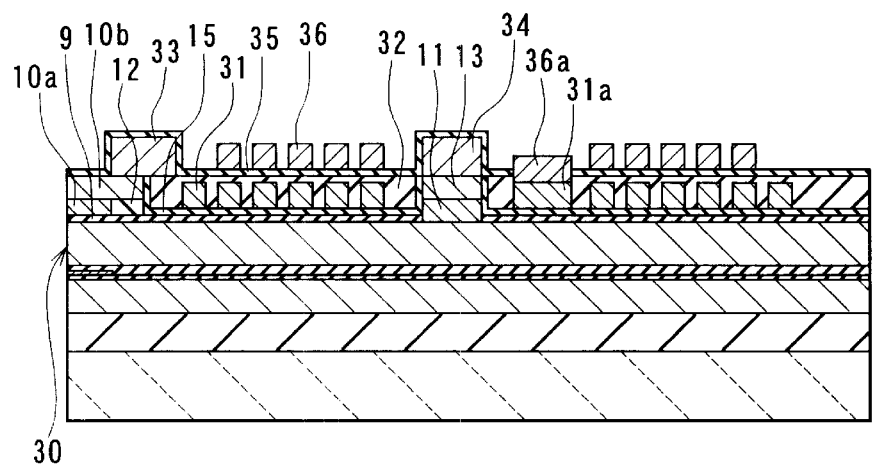
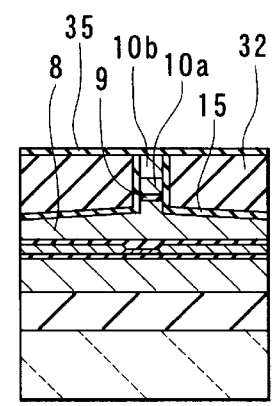
FIG. 17A FIG. 17B

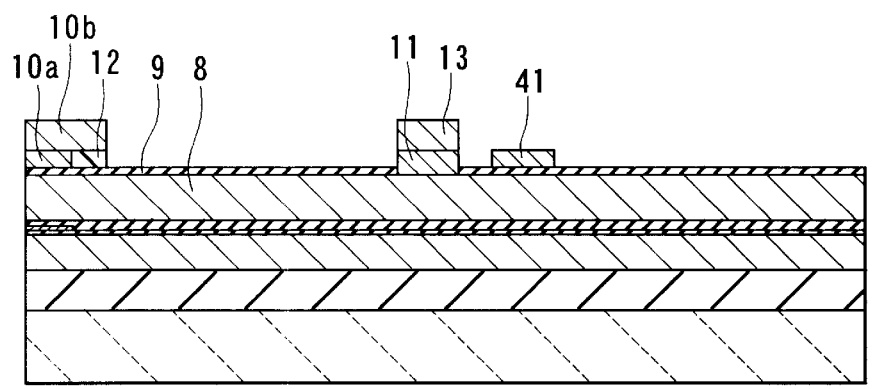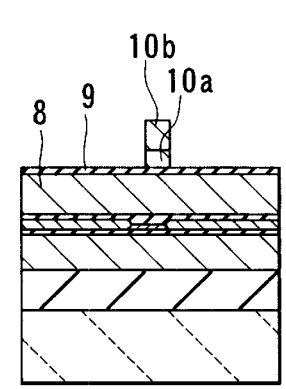
FIG. 20A  FIG. 20B
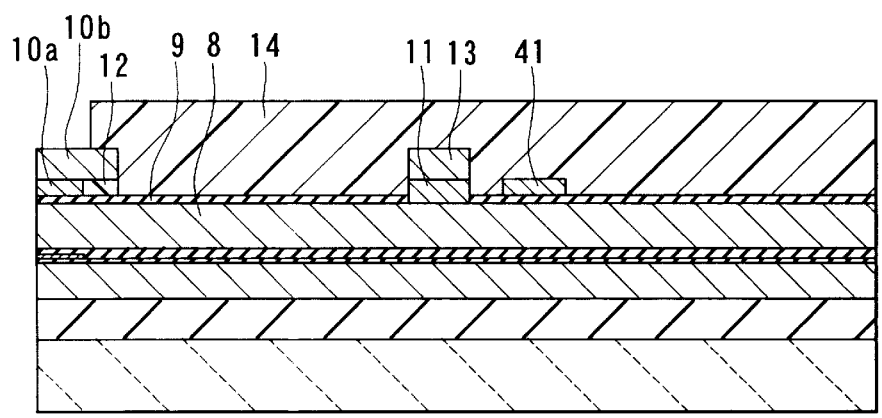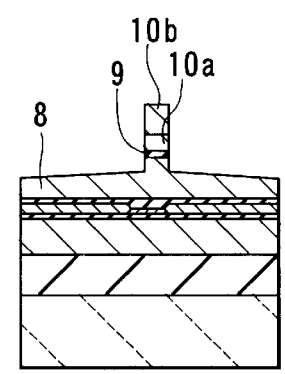
FIG. 21A  FIG. 21B

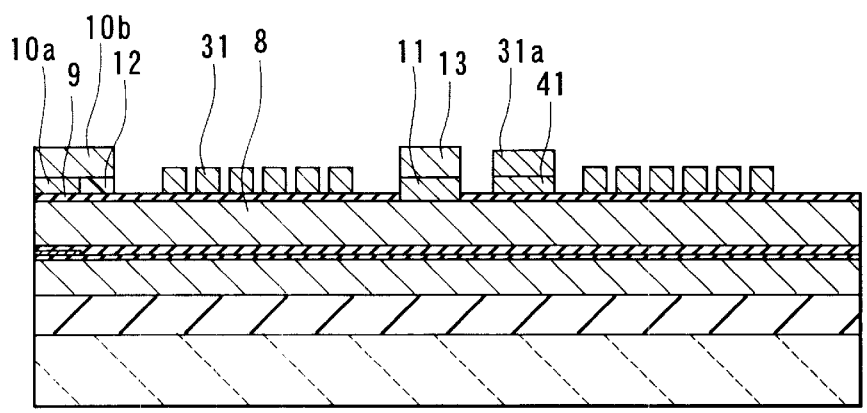
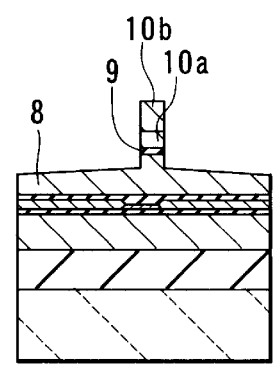
FIG. 22A  FIG. 22B
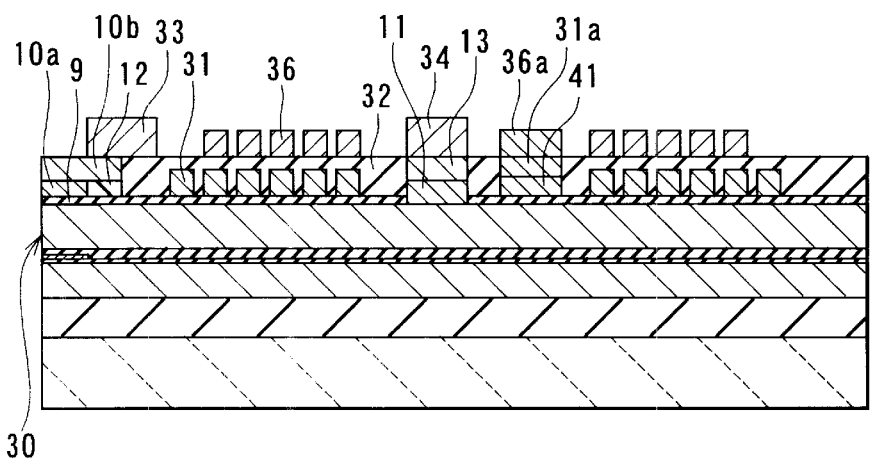
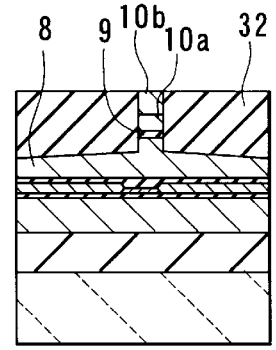
FIG. 23A  FIG. 23B

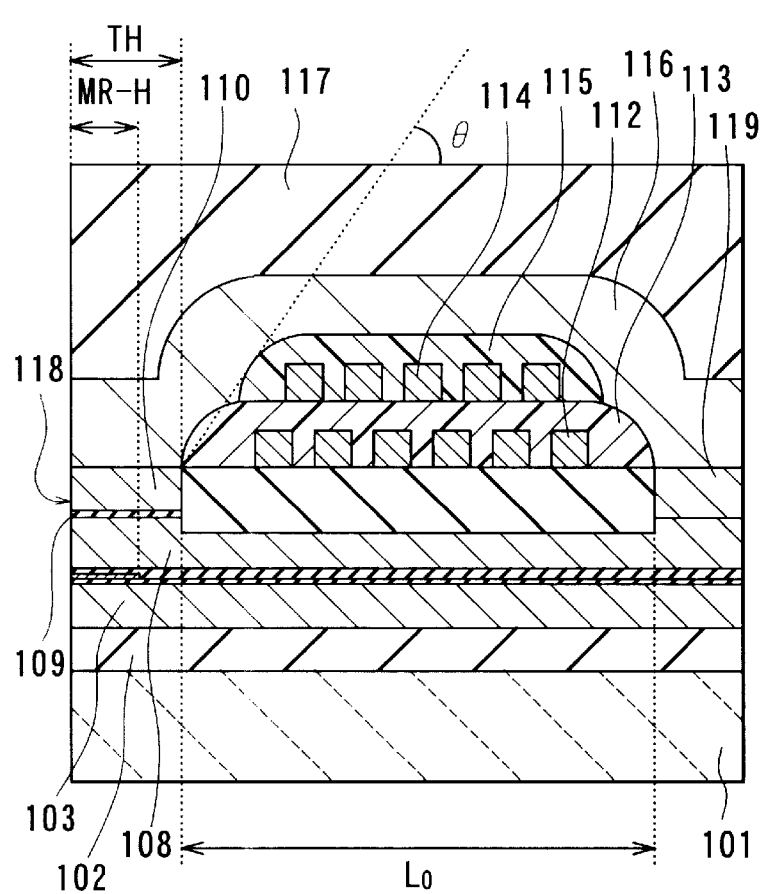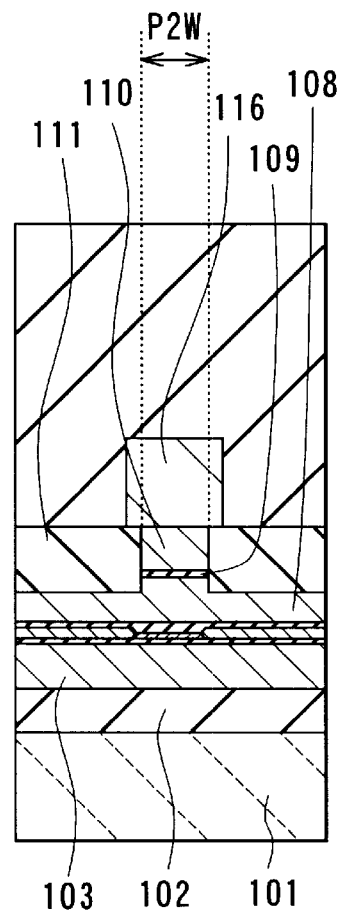
FIG. 28A
RELATED ART
FIG. 28B
RELATED ART

THIN-FILM MAGNETIC HEAD INCLUDING TWO STACKED POLE PORTION LAYERS OF EQUAL WIDTHS, AND METHOD OF MANUFACTURING SAME

BACKGROUND OF THE INVENTION

1. Field of the Invention

The present invention relates to a thin-film magnetic head having at least an induction-type magnetic transducer and a method of manufacturing such a thin-film magnetic head.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to a submicron order. Semiconductor process techniques are utilized to implement such a structure.

Reference is now made to FIG. 25A to FIG. 28A and FIG. 25B to FIG. 28B to describe an example of a method of manufacturing a composite thin-film magnetic head as an example of a related-art method of manufacturing a thin-film magnetic head. FIG. 25A to FIG. 28A are cross sections each orthogonal to an air bearing surface of the thin-film magnetic head. FIG. 25B to FIG. 28B are cross sections of a pole portion of the head each parallel to the air bearing surface.

In the manufacturing method, as shown in FIG. 25A and FIG. 25B, an insulating layer 102 made of alumina ($Al_2O_3$), for example, having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 $\mu$m is formed. The bottom pole layer 108 is made of a magnetic material and used for both a reproducing head and a recording head.

Next, as shown in FIG. 26A and FIG. 26B, on the bottom pole layer 108, a recording gap layer 109 made of an insulating film such as an alumina film whose thickness is 0.2 $\mu$m is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 27A and FIG. 27B, the recording gap layer 109 and the bottom pole layer 108 are etched through ion milling, using the top pole tip 110 as a mask. As shown in FIG. 27B, the structure is called a trim structure wherein the sidewalls of the top pole (the top pole tip 110), the recording gap layer 109, and part of the bottom pole layer 108 are formed vertically in a self-aligned manner.

Next, an insulating layer 111 made of an alumina film, for example, and having a thickness of about 3 $\mu$m is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific pattern on the insulating layer 111 and the first layer 112. Heat treatment is then performed at a specific temperature to flatten the surface of the photoresist layer 113. On the photoresist layer 113, a second layer 114 of the thin-film coil is then formed. Next, a photoresist layer 115 is formed into a specific pattern on the photoresist layer 113 and the second layer 114. Heat treatment is then performed at a specific temperature to flatten the surface of the photoresist layer 115.

Next, as shown in FIG. 28A and FIG. 28B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the thin-film magnetic head including the recording head and the reproducing head. The thin-film magnetic head is thus completed.

FIG. 29 is a top view of the thin-film magnetic head shown in FIG. 28A and FIG. 28B. The overcoat layer 117 and the other insulating layers and insulating films are omitted in FIG. 29.

In FIG. 28A, 'TH' indicates the throat height and 'MR-H' indicates the MR height. The throat height is the length (height) of portions of magnetic pole layers facing each other with a recording gap layer in between, between the air-bearing-surface-side end and the other end. The MR height is the length (height) between the air-bearing-surface-side end of the MR element and the other end. In FIG. 28B, 'P2W' indicates the pole width, that is, the recording track width. In addition to the throat height, the MR height and so on, the apex angle as indicated with $\theta$ in FIG. 28A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle $\theta$, and track width P2W as shown in FIG. 28A and FIG. 28B.

To achieve high surface recording density, that is, to fabricate a recording head with a narrow track structure, it has been particularly required that track width P2W fall within the submicron order of 1.0 μm or less. It is therefore required to process the top pole into the submicron order through semiconductor process techniques.

A problem is that it is difficult to form the top pole layer on the apex into small dimensions.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern having a width of the submicron order through the use of a photoresist film. Therefore, it is required to form a fine pattern of the submicron order on top of the apex through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may be out of shape. It is therefore impossible to obtain a sharp and precise photoresist pattern.

As thus described, it is difficult in prior art to fabricate the top pole layer with accuracy if the pole width of the submicron order is required.

To overcome the problems thus described, a method has been taken, as shown in the foregoing related-art manufacturing steps illustrated in FIG. 26A to FIG. 28A and FIG. 26B to FIG. 28B. In this method, a track width of 1.0 μm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, it is possible that the top pole tip 110 that defines the track width is formed into small dimensions to some degree on the flat top surface of the recording gap layer 109.

However, the following problems (1) to (3) are still found in the thin-film magnetic head having a structure as shown in FIG. 28A and FIG. 28B.

(1) In the thin-film magnetic head shown in FIG. 28A and FIG. 28B, the recording track width and the throat height are defined by the top pole tip 110. Therefore, if the recording track width is extremely reduced, that is, down to 0.5 μm or less, in particular, the size of the top pole tip 110 is thus extremely reduced. As a result, pattern edges may be rounded and it is difficult to form the top pole tip 110 with accuracy. Therefore, the thin-film magnetic head having the structure as shown in FIG. 28A and FIG. 28B has a problem that it is difficult to precisely define the recording track width and the throat height if the recording track width is extremely reduced.

(2) In the thin-film magnetic head shown in FIG. 28A and FIG. 28B, the recording track width is defined by the top pole tip 110. Therefore, it is not necessary that the top pole layer 116 is processed into dimensions as small as those of the top pole tip 110. However, if the recording track width is extremely reduced, that is, down to 0.5 μm or less, in particular, processing accuracy for achieving the submicron-order width is required for the top pole layer 116, too. However, the top pole layer 116 is formed on top of the apex in the head shown in FIG. 28A and FIG. 28B. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in this thin-film magnetic head. In addition, the end face of the top pole layer 116 is exposed from the air bearing surface. As a result, writing may be performed by the thin-film magnetic head on a side of the top pole layer 116, too, and so-called 'side write' may result, that is, data is written in a region of a recording medium where data is not supposed to be written. Such a problem more frequently results when the coil is two-layer or three-layer to improve the performance of the recording head and the apex is thereby increased in height, compared to the case where the coil is one-layer.

(3) In the thin-film magnetic head shown in FIG. 28A and FIG. 28B, the cross-sectional area of the magnetic path abruptly decreases in a portion where the top pole layer 116 is in contact with the top pole tip 110. Consequently, the magnetic flux is saturated in this portion, and it is impossible to efficiently utilize the magnetomotive force generated by the layers 112 and 114 of the thin-film coil for recording.

Furthermore, in a prior-art magnetic head, it is difficult to reduce the magnetic path (yoke) length. That is, if the coil pitch is reduced, a head with a reduced yoke length is achieved and a recording head having an excellent high frequency characteristic is achieved, in particular. However, if the coil pitch is reduced to the limit, the distance between the zero throat height position (the position of the air-bearing-surface-side end of the insulating layer that defines the throat height) and the outermost end of the coil is a major factor that prevents a reduction in yoke length. Since the yoke length of a two-layer coil can be shorter than that of a single-layer coil, a two-layer coil is adopted to many of recording heads for high frequency application. However, in the prior-art magnetic head, a photoresist film having a thickness of about 2 μm is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shorted.

Therefore, if the total coil thickness is 2 to 3 μm, the thickness of the insulating film between the layers of the coil is 2 μm, and the apex angle is 45 to 55 degrees, for example, the yoke length is required to be 6 to 8 $\mu$m which is twice as long as the distance between the outermost end of the coil and the neighborhood of the zero throat height position, that is, 3 to 4 $\mu$m (the distance between the innermost end of the coil and the portion where the top and bottom pole layers are in contact with each other is required to be 3 to 4 $\mu$m, too), in addition to the length of the portion corresponding to the coil. This length of the portion other than the portion corresponding to the coil is one of the factors that prevent a reduction in yoke length.

Assuming that a two-layer eleven-turn coil whose line width is 1.2 $\mu$m and the space is 0.8 $\mu$m is fabricated, for example, the portion of the yoke length corresponding to the first layer 112 of the coil is 11.2 $\mu$m, if the first layer is made up of six turns and the second layer is made up of 5 turns, as shown in FIG. 28A and FIG. 28B. In addition to this length, the total of 6 to 8 $\mu$m, that is, the distance between each of the outermost and innermost ends of the first layer 112 of the coil and each of ends of the photoresist layer 113 for insulating the first layer 112, is required for the yoke length. Therefore, the yoke length is 17.2 to 19.2 $\mu$m. If an 11-turn coil is made up of one layer, the yoke length is 27.2 to 29.2 $\mu$m. In the present patent application, the yoke length is the length of a portion of the pole layer except the pole portion and the contact portions, as indicated with $L_0$ in FIG. 28A. As thus described, it is difficult in the prior art to further reduce the yoke length, which prevents improvements in high frequency characteristic.

OBJECTS AND SUMMARY OF THE INVENTION

It is a first object of the invention to provide a thin-film magnetic head and a method of manufacturing the same for defining a track width and a throat height of an induction-type magnetic transducer with accuracy even if the track width is reduced and for preventing saturation of a magnetic flux halfway through a magnetic path.

In addition to the first object, it is a second object of the invention to provide a thin-film magnetic head and a method of manufacturing the same for preventing writing of data in a region where data is not supposed to be written.

In addition to the first object, it is a third object of the invention to provide a thin-film magnetic head and a method of manufacturing the same for achieving a reduction in yoke length.

A thin-film magnetic head of the invention comprises: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. One of the magnetic layers includes: a first pole portion layer forming a part of one of the pole portions and having a width equal to a recording track width and a length equal to a throat height, a surface of the first pole portion layer being adjacent to the gap layer; a second pole portion layer including the other part of the one of the pole portions, a surface of the second pole portion layer touching the other surface of the first pole portion layer, a portion of the second pole portion layer that touches the first pole portion layer having a width equal to the width of the first pole portion layer, an entire length of the second pole portion layer being greater than the length of the first pole portion layer; and a yoke portion layer forming a yoke portion and connected directly or indirectly to the other surface of the second pole portion layer.

In the thin-film magnetic head of the invention, the first pole portion layer of the one of the magnetic layers has a length equal to the throat height. Therefore, the throat height is defined by the first pole portion layer. In the head each of the first and second pole portion layers of the one of the magnetic layers has a width equal to the recording track width. Therefore, the recording track width is defined by the first and second pole portion layers. The yoke portion layer is connected directly or indirectly to the second pole portion layer.

A method of the invention is provided for manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The method includes the steps of: forming the first magnetic layer; forming the gap layer on the first magnetic layer; forming the second magnetic layer on the gap layer; and forming the coil such that the at least part of the coil is placed between the first and second magnetic layers, the at least part of the coil being insulated from the first and second magnetic layers. The step of forming the second magnetic layer includes the steps of: forming a first pole portion layer including a portion to be a part of one of the pole portions, the portion of the first pole portion layer to be the part of the one of the pole portions having a length equal to a throat height, a surface of the first pole portion layer being adjacent to the gap layer; forming a second pole portion layer including the other part of the one of the pole portions, a surface of the second pole portion layer touching the other surface of the first pole portion layer, a portion of the second pole portion layer touching the first pole portion layer having a width equal to a recording track width, an entire length of the second pole portion layer being greater than the length of the portion of the first pole portion layer to be the part of the one of the pole portions; etching the first pole portion layer through the use of the second pole portion layer as a mask, such that the portions of the first and second pole portion layers touching each other are made equal in width; and forming a yoke portion layer making up a yoke portion and connected directly or indirectly to the other surface of the second pole portion layer.

According to the method of manufacturing the thin-film magnetic head of the invention, the throat height is defined by the first pole portion layer of the second magnetic layer. In the method the first pole portion layer is etched through the use of the second pole portion layer of the second magnetic layer as a mask. The width of the first pole portion layer is thereby made equal to the width of the second pole portion layer, that is, the recording track width. Therefore, the recording track width is defined by the first and second pole portion layers. The yoke portion layer is connected directly or indirectly to the second pole portion layer.

According to the thin-film magnetic head or the method of manufacturing the same of the invention, an end face of the yoke portion layer that faces toward the medium facing surface may be located at a distance from the medium facing surface.

According to the head or the method of the invention, an insulating layer located on a side of the first pole portion layer may be further provided. A surface of the insulating layer that faces the second pole portion layer is flattened, together with the other surface of the first pole portion layer.

According to the head or the method of the invention, the at least part of the coil may be placed on a side of the first pole portion layer. In this case, a coil insulating layer may be further provided. The coil insulating layer covers the at least part of the coil located on the side of the first pole portion layer. A surface of the coil insulating layer that faces the yoke portion layer is flattened, together with the other surface of the second pole portion layer.

According to the head or the method of the invention, the thin-film coil may include: a first portion located on a side of the first pole portion layer; and a second portion located between the first portion and the yoke portion layer. In this case, a coil insulating layer may be further provided and the second portion of the coil may be located between the coil insulating layer and the yoke portion layer. The coil insulating layer covers the first portion of the coil located on the side of the first pole portion layer. A surface of the coil insulating layer that faces the yoke portion layer is flattened, together with the other surface of the second pole portion layer.

According to the head or the method of the invention, one of the magnetic layers may further include a connection layer for connecting the second pole portion layer to the yoke portion layer. In this case, the thin-film coil may include: a first portion located on a side of the first pole portion layer; and a second portion located on a side of the connection layer. If the thin-film coil includes such first and second portions, the head may further comprise: a first coil insulating layer that covers the first portion of the coil located on the side of the first pole portion layer, a surface of the first coil insulating layer that faces the yoke portion layer being flattened, together with the other surface of the second pole portion layer; and a second coil insulating layer that covers the second portion of the coil located on the side of the connection layer, a surface of the second coil insulating layer that faces the yoke portion layer being flattened, together with a surface of the connection layer that faces the yoke portion layer.

According to the head of the invention, the first pole portion layer may be made of a high saturation flux density material; and a value obtained through dividing a thickness of the first pole portion layer by the width thereof may be 0.5 or greater. In the present invention the high saturation flux density material is a magnetic material having saturation flux density of 1.4 T or greater.

The head of the invention may further comprise: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

In the method of the invention the first pole portion layer may be etched through reactive ion etching in the step of etching. In this case, it is possible that a mask pattern is formed on the second pole portion layer and the second pole portion layer is etched through reactive ion etching with the mask pattern as a mask, and the first pole portion layer is then etched through reactive ion etching with the mask pattern and the second pole portion layer as masks in the step of etching. In the method of the invention a portion of the first magnetic layer may be etched through reactive ion etching with the mask pattern and the second pole portion layer as masks after the first pole portion layer is etched through reactive ion etching with the mask pattern and the second pole portion layer as the masks.

In the method of the invention the second pole portion layer may be formed through plating. In this case, the first pole portion layer may be etched through reactive ion etching with the second pole portion layer as a mask in the step of etching. In the method of the invention a portion of the first magnetic layer may be etched through reactive ion etching with the second pole portion layer as a mask after the first pole portion layer is etched through reactive ion etching with the second pole portion layer as the mask.

If the first pole portion layer is etched through reactive ion etching as stated above, the first pole portion layer may be made of a high saturation flux density material; and the first pole portion layer may be formed such that a value obtained through dividing a thickness of the first pole portion layer by the width thereof is 0.5 or greater. A gas of $Cl_2$ or $BCl_3$ may be used for the reactive ion etching in the step of etching the first pole portion layer. The reactive ion etching may be performed at a temperature in a range between 50 and 300° C. inclusive in the step of etching the first pole portion layer.

The method of the invention may further include the step of forming: a magnetoresistive element; a first shield layer and a second shield layer for shielding the magnetoresistive element, portions of the first and second shield layers located in regions on a side of the medium facing surface being opposed to each other, the magnetoresistive element being placed between the portions of the shield layers; and a first insulating film placed between the magnetoresistive element and the first shield layer, and a second insulating film placed between the magnetoresistive element and the second shield layer. In this case, at least one of the first and second insulating films may be formed through chemical vapor deposition.

Other and further objects, features and advantages of the invention will appear more fully from the following description.

BRIEF DESCRIPTION OF THE DRAWINGS

FIG. 3A and FIG. 3B are cross sections for illustrating a step that follows FIG. 2 and FIG. 2B.

FIG. 3A and FIG. 4B are cross sections for illustrating a step that follows FIG. 3A and FIG. 3B.

FIG. 5A and FIG. 5B are cross sections for illustrating a step that follows FIG. 2A and FIG. 4B.

FIG. 6A and FIG. 6B are cross sections for illustrating a step that follows FIG. 5A and FIG. 5B.

FIG. 16A and FIG. 16B are cross sections for illustrating a step that follows FIG. 15A and FIG. 15B.

FIG. 17A and FIG. 17B are cross sections for illustrating a step that follows FIG. 16A and FIG. 16B.

FIG. 20A and FIG. 20B are cross sections for illustrating a step that follows FIG. 19A and FIG. 19B.

FIG. 21A and FIG. 21B are cross sections for illustrating a step that follows FIG. 20A and FIG. 20B.

FIG. 22A and FIG. 22B are cross sections for illustrating a step that follows FIG. 21A and FIG. 21B.

FIG. 23A and FIG. 23B are cross sections for illustrating a step that follows FIG. 22A and FIG. 22B.

FIG. 28A and FIG. 28B are cross sections for illustrating a step that follows FIG. 27A and FIG. 27B.

DETAILED DESCRIPTION OF THE PREFERRED EMBODIMENTS

Preferred embodiments of the invention will now be described in detail with reference to the accompanying drawings.

First Embodiment

Reference is now made to FIG. 1A to FIG. 8A, FIG. 1B to FIG. 8B, FIG. 9 and FIG. 10 to describe a thin-film magnetic head and a method of manufacturing the same of a first embodiment of the invention. FIG. 1A to FIG. 8A are cross sections each orthogonal to an air bearing surface. FIG. 1B to FIG. 8B are cross sections of the pole portion each parallel to the air bearing surface.

Figures 1A, 1B:
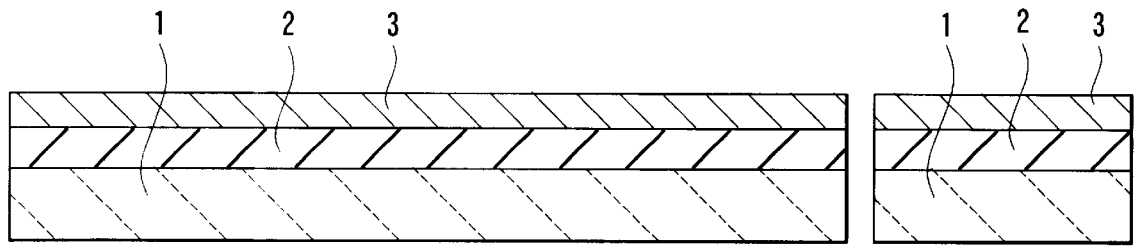
FIG. 1A and FIG. 1B are cross sections for illustrating a step in a method of manufacturing a thin-film magnetic head of a first embodiment of the invention.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed, and the surface is flattened.

Figures 2A, 2B:
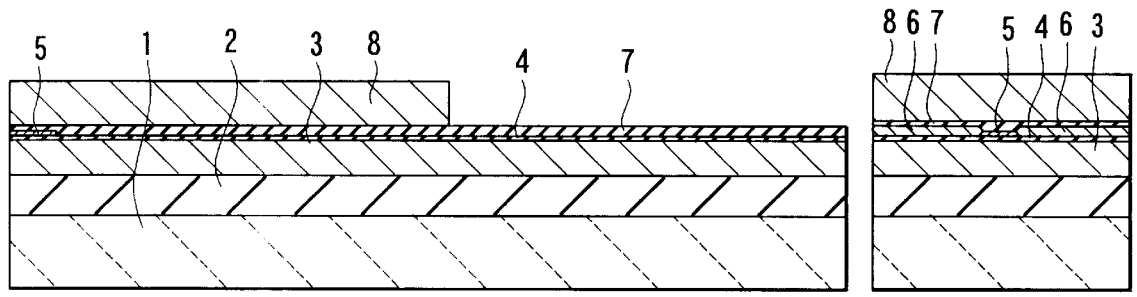
FIG. 2A and FIG. 2B are cross sections for illustrating a step that follows FIG. 1A and FIG. 1B.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD) using trimethyl aluminum ($Al(CH_3)_3$) and $H_2O$, for example. Through the use of CVD, it is possible to make the thin and precise shield gap films 4 and 7 with few pinholes.

Next, on the top shield gap film 7, a top-shield layer-cum-bottom-pole-layer (called a bottom pole layer in the following description) 8 having a thickness of about 2.5 to 3.5 $\mu$m is selectively formed. The bottom pole layer 8 is made of a magnetic material and used for both a reproducing head and a recording head.

Next, as shown in FIG. 3A and FIG. 3B, a recording gap layer 9 made of an insulating material whose thickness is about 0.2 to 0.3 $\mu$m, for example, is formed on the bottom pole layer 8 and the top shield gap film 7. In general, the insulating material used for the recording gap layer 9 may be alumina, aluminum nitride, a silicon-dioxide-base material, a silicon-nitride-base material, or diamond-like carbon (DLC) and so on.

Next, a portion of the recording gap layer 9 located near an end of the bottom pole layer 8 opposite to an air bearing surface 30 (that is, on the right side of FIG. 3A) is etched to form a contact hole 9a for making the magnetic path.

Next, a first pole portion layer 10a having a thickness of about 0.5 to 1.0 $\mu$m, for example, is formed on a portion of the recording gap layer 9 in a neighborhood of an end of the recording gap layer 9 on a side of the air bearing surface 30. The first pole portion layer 10a is made of a magnetic material and forms a part of the pole portion of the top pole layer. At the same time, a magnetic layer 11 made of a magnetic material and having a thickness of about 0.5 to 1.0 $\mu$m, for example, is formed for making the magnetic path in the contact hole 9a for making the magnetic path. At this point in the manufacturing process, the width of the first pole portion layer 10a (that is, the dimension in the horizontal direction in FIG. 3B) is greater than the recording track width. The length of a portion of the first pole portion layer 10a to be the part of the pole portion (that is, the dimension in the horizontal direction in FIG. 3A) is equal to the throat height.

Next, an insulating layer 12 made of alumina, for example, having a thickness of 4 to 5 $\mu$m, for example, is formed over the entire surface. The insulating layer 12 is then polished through CMP, for example, until the first pole portion layer 10a and the magnetic layer 11 are exposed, and the surface is flattened. Through this polishing, the thickness of a portion of the insulating layer 12 located on top of the bottom pole layer 8 is made 0.5 to 0.8 $\mu$m. In FIG. 3A the zero throat height position is the position of the interface between the first pole portion layer 10a and the insulating layer 12.

Next, as shown in FIG. 4A and FIG. 4B, a second pole portion layer 10b having a thickness of about 2.5 to 3.5 $\mu$m, for example, is formed on the first pole portion layer 10a. The second pole portion layer 10b is made of a magnetic material and includes a portion to be the other part of the pole portion of the top pole layer. At the same time, a magnetic layer 13 having a thickness of about 2.5 to 3.5 $\mu$m, for example, is formed on the magnetic layer 11. The width of a portion of the second pole portion layer 10b touching the first pole portion layer 10a is equal to the recording track width. The entire length of the second pole portion layer 10b is greater than the length of the portion of the first pole portion layer 10a to be the part of the pole portion.

The first pole portion layer 10a and the second pole portion layer 10b may be made of NiFe (80 weight % Ni and 20 weight % Fe), or NiFe (45 weight % Ni and 55 weight % Fe) as a high saturation flux density material and formed into specific patterns through plating or may be made of a material such as FeN or FeZrN as a high saturation flux density material through sputtering and selectively etched through ion milling, for example, into the specific patterns. Alternatively, a material such as CoFe or a Co-base amorphous material as a high saturation flux density material may be used.

Figure 9:
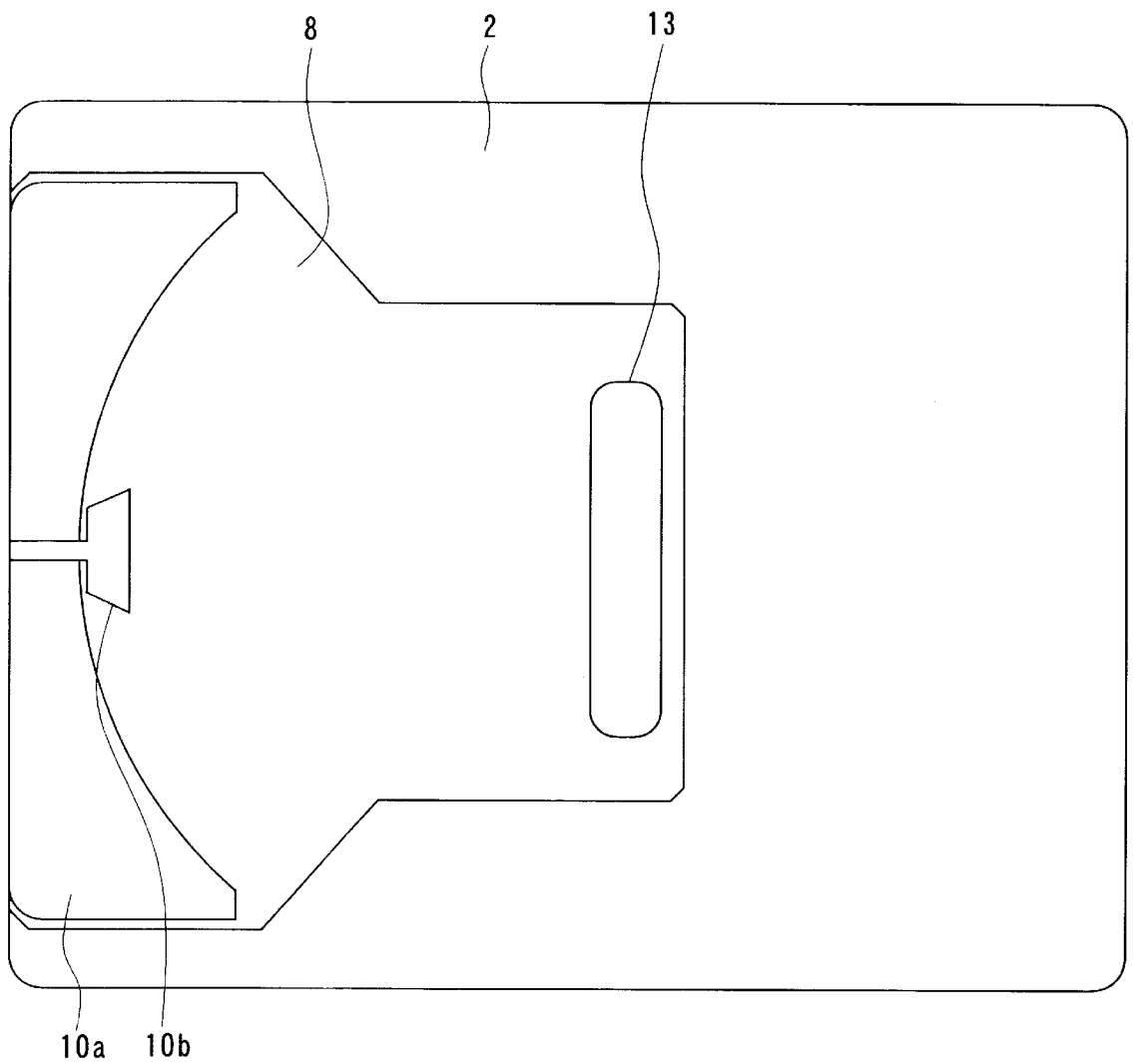
FIG. 9 is a top view of the thin-film magnetic head of the first embodiment in a state of one of the manufacturing steps.

FIG. 9 is a top view corresponding to FIG. 4A and FIG. 4B. The recording gap layer 9 and the insulating layer 12 are omitted in FIG. 9. Although the first pole portion layer 10a is extended in width in FIG. 9, it is acceptable that the width of the first pole portion layer 10a is greater than the recording track width.

Next, as shown in FIG. 5A and FIG. 5B, the first pole portion layer 10a and the insulating layer 12 are etched through ion milling using an argon-base gas, for example, with the second pole portion layer 10b as a mask. As a result, the width of the portion of the first pole portion layer 10a touching the second pole portion layer 10b is made equal to the width of the second pole portion layer 10b, that is, the recording track width.

Next, the recording gap layer 9 is selectively etched through dry etching, using the first pole portion layer 10a and the second pole portion layer 10b as masks. The dry etching may be reactive ion etching (RIE) using a chlorine-base gas such as $BCl_2$ or $Cl_2$, or a fluorine-base gas such as $CF_4$ or $SF_6$, for example. Next, the bottom pole layer 8 is selectively etched by about 0.3 to 0.6 $\mu$m through ion milling using an argon-base gas, for example. A trim structure as shown in FIG. 5B is thus formed. The trim structure suppresses an increase in the effective track width due to expansion of a magnetic flux generated during writing in a narrow track. Alternatively, a photomask (not shown) for trimming may be formed on a portion other than the region where etching is required before etching the recording gap layer 9 and the bottom pole layer 8.

In this embodiment the first pole portion layer 10a may be etched by RIE through the use of a first or second method described below.

The first method is to form a mask pattern made of alumina, for example, on the second pole portion layer 10b and to etch the second pole portion layer 10b and the first pole portion layer 10a by RIE with the mask pattern as a mask. According to the first method, the second pole portion layer 10b is first patterned by RIE with the mask pattern as the mask. The first pole portion layer 10a is then patterned by RIE with the mask pattern and the patterned second pole portion layer 10b as masks. Therefore, the method of manufacturing a thin-film magnetic head of the invention includes this first method, too. In the first method the trim structure may be obtained through further etching the recording gap layer 9 and part of the bottom pole layer 8 by RIE with the above-mentioned mask pattern as a mask. In the first method the first pole portion layer 10a and the second pole portion layer 10b may be made of NiFe, for example, through plating, or may be made of a high saturation flux density material such as FeN or CoFe through sputtering.

The second method is to form the second pole portion layer 10b made of NiFe, for example, through plating into a specific pattern and to etch the first pole portion layer 10a by RIE with the second pole portion layer 10b as a mask. In the second method the trim structure may be obtained through further etching the recording gap layer 9 and part of the bottom pole layer 8 by RIE with the second pole portion layer 10b as a mask. In the second method the first pole portion layer 10a may be made of NiFe, for example, through plating, or may be made of a high saturation flux density material such as FeN or CoFe through sputtering.

In the second method a gas used for RIE is preferably $Cl_2$ or $BCl_3$. It is preferred that RIE is performed at a temperature in a range between 50 and 300° C. inclusive in the second method. Performing RIE at such a high temperature prevents Ni molecules from redepositing when RIE is performed if the second pole portion layer 10b is made of NiFe.

According to the second method, it is possible to form the second pole portion layer 10b such that the track width is 0.3 $\mu$m or less since the second pole portion layer 10b is formed through plating. It is further possible to make the first pole portion layer 10a having a width of 0.3 $\mu$m or less since the first pole portion layer 10a is etched with the second pole portion layer 10b as the mask.

According to the second method, the first pole portion layer 10a is etched by RIE with the second pole portion layer 10b as the mask. As a result, it is impossible that the pattern of the second pole portion layer 10b goes out of shape. It is thus possible to form the first pole portion layer 10a having a width of 0.3 $\mu$m or less, for example, with accuracy.

Figure 11:
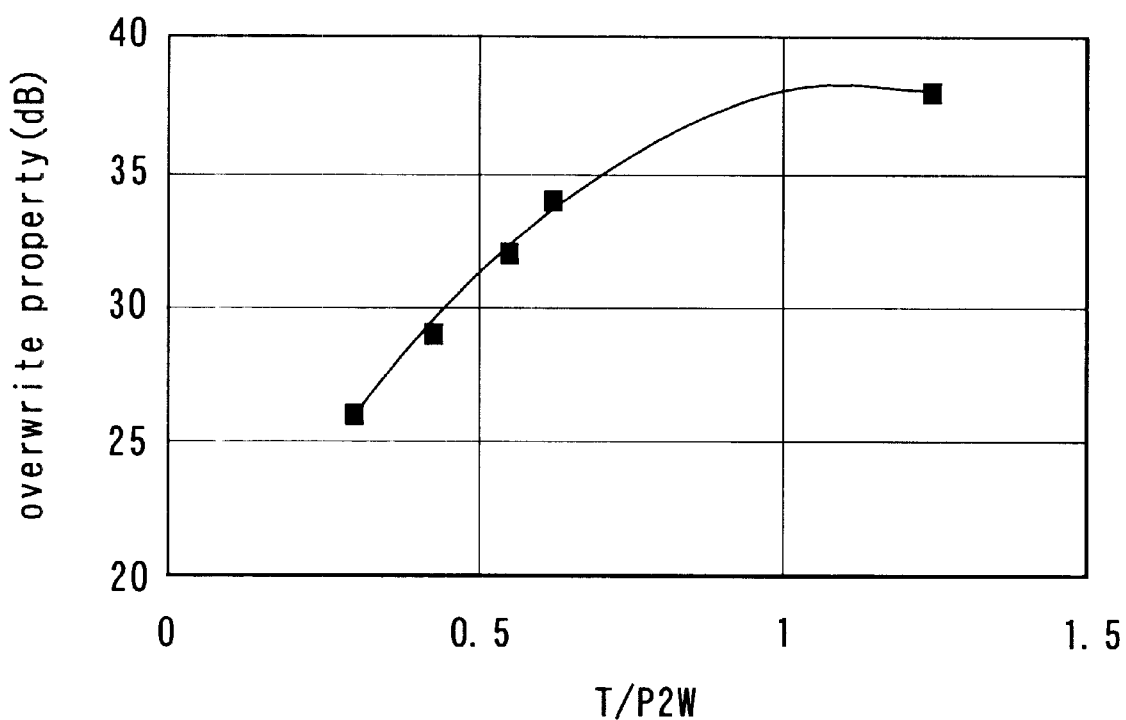
FIG. 11 is a plot for illustrating an example of the relationship between an overwrite property and T/P2W that is a value of thickness T of a first pole portion layer divided by width P2W thereof in the first embodiment.

The following is a description of the case in which the first pole portion layer 10a is formed through sputtering a high saturation flux density material, and the first pole portion layer 10a is etched by RIE with the second pole portion layer 10b formed through plating as a mask, so as to form the first pole portion layer 10a into a specific pattern. FIG. 11 shows an example of a result of an experiment for obtaining the relationship between T/P2W and an overwrite property that is a parameter indicating one of characteristics when data is written over existing data. T/P2W is a value of thickness T of the first pole portion layer 10a divided by width P2W of the patterned first pole portion layer 10a, that is, the recording track width. As shown, it is favorable that the overwrite property is 30 dB or greater when T/P2W is 0.5 or greater.

Next, as shown in FIG. 6A and FIG. 6B, an insulating film 15 of alumina, for example, having a thickness of about 0.3 to 0.5 μm is formed over the entire surface. The insulating film 15 is provided for insulating a thin-film coil described later from the bottom pole layer 8. Next, the thin-film coil 16 made of copper (Cu), for example, is formed by frame plating on the insulating film 15. For example, the thickness of the coil 16 is about 1.0 to 2.0 μm and the pitch is 1.2 to 2.0 μm. The coil 16 is wound around the magnetic layers 11 and 13 and a part of the coil 16 is located on a side of the first pole portion layer 10a. In FIG. 6A numeral 16a indicates a portion for connecting the coil 16 to a conductive layer (lead) described later.

Figures 7A, 7B:
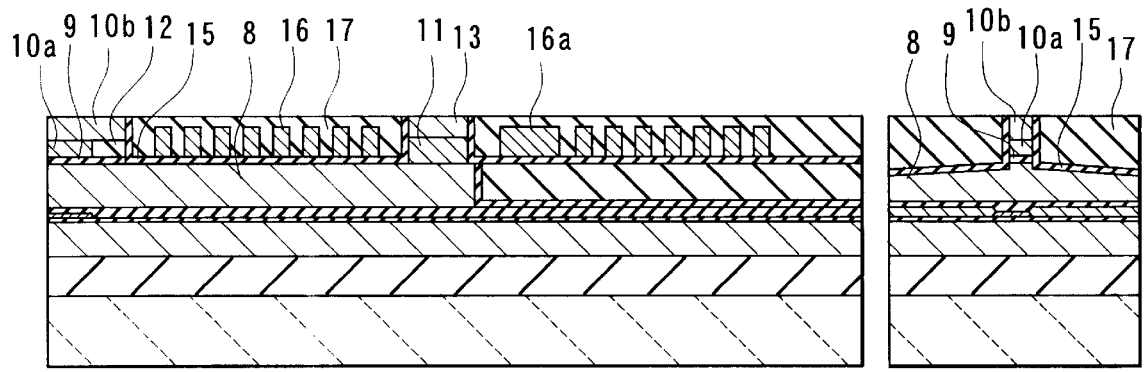
FIG. 7A and FIG. 7B are cross sections for illustrating a step that follows FIG. 6A and FIG. 6B.

Next, as shown in FIG. 7A and FIG. 7B, a coil insulating layer 17 of alumina, for example, having a thickness of about 3 to 4 μm is formed over the entire surface. The insulating layer 17 is then polished through CMP, for example, so that the second pole portion layer 10b and the magnetic layer 13 are exposed, and the surface is flattened. Although the coil 16 is not exposed in FIG. 7A, the coil 16 may be exposed. If the coil 16 is exposed, an insulating film is formed to cover the coil 16.

Figures 8A, 8B:
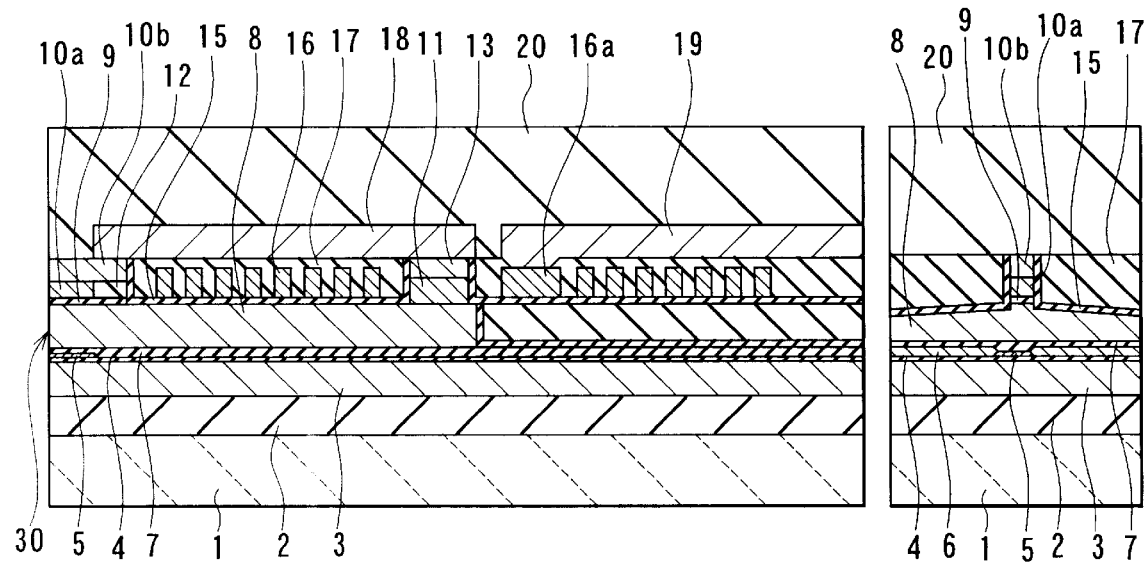
FIG. 8A and FIG. 8B are cross sections of the thin-film magnetic head of the first embodiment.

Next, as shown in FIG. 8A and FIG. 8B, a portion of the coil insulating layer 17 located on the connection portion 16a is etched to form a contact hole. A yoke portion layer 18 having a thickness of about 2.0 to 3.0 μm, for example, is formed to be a yoke portion of the top pole layer on the second pole portion layer 10b, the coil insulating layer 17 and the magnetic layer 13. At the same time, the conductive layer 19 having a thickness of about 2.0 to 3.0 μm and connected to the portion 16a is formed. The yoke portion layer 18 may be made of NiFe (80 weight % Ni and 20 weight % Fe), or NiFe (45 weight % Ni and 55 weight % Fe) as a high saturation flux density material and formed into a specific pattern through plating or may be made of a material such as FeN or FeZrN as a high saturation flux density material through sputtering and then selectively etched through ion milling, for example, into the specific pattern. Alternatively, a material such as CoFe or a Co-base amorphous material as a high saturation flux density material may be used. To improve the high frequency characteristic, the yoke portion layer 18 may be made of a number of layers of inorganic insulating films and magnetic layers of Permalloy, for example.

An end face of the yoke portion layer 18 facing toward the air bearing surface 30 is located at a distance of only 0.5 to 1.0 μm, for example, from the air bearing surface 30. In this embodiment, in particular, the end face of the yoke portion layer 18 is located near the zero throat height position.

Next, an overcoat layer 20 of alumina, for example, having a thickness of 20 to 40 μm is formed over the entire surface. The surface of the overcoat layer 20 is then flattened and pads (not shown) for electrodes are formed on the overcoat layer 20. Finally, lapping of the slider is performed to form the air bearing surfaces 30 of the thin-film magnetic head including the recording head and the reproducing head. The thin-film magnetic head of the embodiment is thus completed.

In this embodiment the bottom pole layer 8 corresponds to a first magnetic layer of the invention. The top pole layer made up of the first pole portion layer 10a, the second pole portion layer 10b, the magnetic layers 11 and 13 and the yoke portion layer 18 corresponds to a second magnetic layer of the invention. The bottom shield layer 3 corresponds to a first shield layer of the invention. Since the bottom pole layer 8 also functions as the top shield layer, the bottom pole layer 8 corresponds to a second shield layer of the invention, too.

Figure 10:
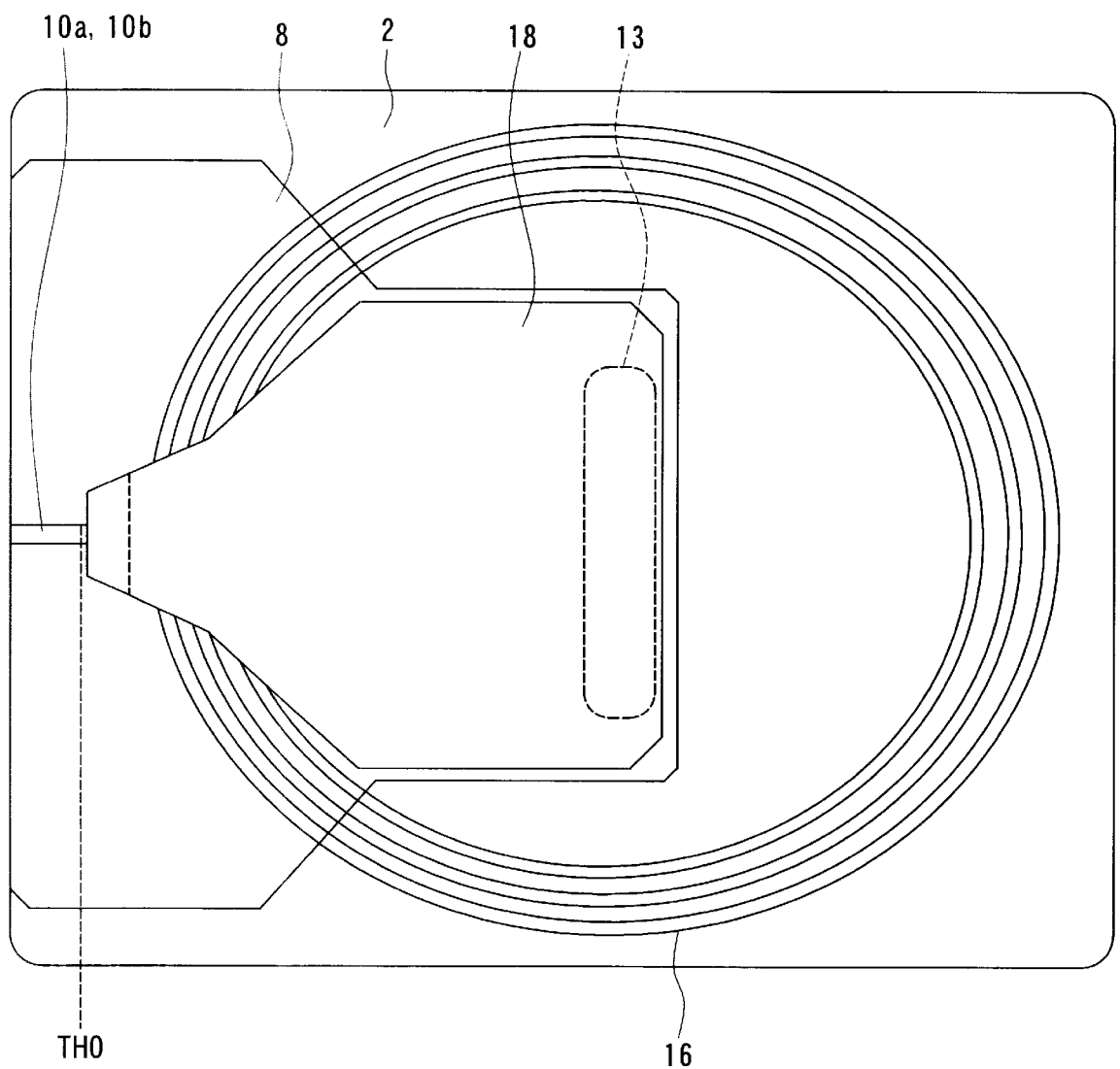
FIG. 10 is a top view of the thin-film magnetic head of the first embodiment.

FIG. 10 is a top view of the thin-film magnetic head of the embodiment. The overcoat layer 20 and the other insulating layers and insulating films are omitted in FIG. 10. In FIG. 10 'TH0' indicates the zero throat height position.

As described so far, the thin-film magnetic head of the embodiment comprises the reproducing head and the recording head (the induction-type magnetic transducer). The reproducing head has: the MR element 5; and the bottom shield layer 3 and the top shield layer (bottom pole layer 8) for shielding the MR element 5. Portions of the bottom shield layer 3 and the top shield layer on a side of the medium facing surface (the air bearing surface 30) facing toward a recording medium are opposed to each other, the MR element 5 being placed between the portions.

The recording head has the bottom pole layer 8 and the top pole layer (including the first pole portion layer 10a, the second pole portion layer 10b, the magnetic layers 11 and 13 and the yoke portion layer 18) magnetically coupled to each other, each of which includes at least one layer. The bottom pole layer 8 and the top pole layer include pole portions opposed to each other and placed in regions on a side of the medium facing surface. The recording head further has: the recording gap layer 9 placed between the pole portion of the bottom pole layer 8 and the pole portion of the top pole layer; and the thin-film coil 16 at least a part of which is placed between the two pole layers, the at least part of the coil being insulated from the two pole layers.

In the embodiment the top pole layer has: the first pole portion layer 10a, the second pole portion layer 10b, and the yoke portion layer 18. The first pole portion layer 10a forms a part of the pole portion and has a width equal to the recording track width and a length equal to the throat height. One of the surfaces of the first pole portion layer 10a is adjacent to the recording gap layer 9. The second pole portion layer 10b includes a portion to be the other part of the pole portion. The width of a portion of the second pole portion layer 10b touching the first pole portion layer 10a is equal to the width of the first pole portion layer 10a, that is, the recording track width. The entire length of the second pole portion layer 10b is greater than the length of the first pole portion layer 10a. One of the surfaces of the second pole portion layer 10b touches the other surface of the first pole portion layer 10a. The yoke portion layer 18 is connected to the other surface of the second pole portion layer 10b and forms the yoke portion. Therefore, according to the embodiment, the throat height is defined by the first pole portion layer 10a of the top pole layer. The recording track width is defined by the first pole portion layer 10a and the second pole portion layer 10b of the top pole layer.

In this embodiment the first pole portion layer 10a finally has a length equal to the throat height and a width equal to the recording track width. However, the first pole portion layer 10a is first formed to have a width greater than the recording track width. The second pole portion layer 10b having a width equal to the recording track width is then formed, which is followed by etching of the first pole portion layer 10a with the second pole portion layer 10b as a mask. The width of the first pole portion layer 10a is thereby made equal to the recording track width. As thus described, according to the embodiment, the first pole portion layer 10a is first formed to have a width greater than the recording track width. As a result, the first pole portion layer 10a is formed with more accuracy without pattern edges being rounded, compared to the case where the pole portion originally has a width equal to the recording track width and a length equal to the throat height. Furthermore, according to the embodiment, the first pole portion layer 10a is formed on the flat surface. The first pole portion layer 10a is thus formed with further accuracy in this respect, too. Therefore, according to the embodiment, the throat height is defined with accuracy even when the track width is reduced.

According to the embodiment, the second pole portion layer 10b is formed such that: the width of the portion of the second pole portion layer 10b touching the first pole portion layer 10a is equal to the recording track width; and the entire length of the second pole portion layer 10b is greater than the length of the first pole portion layer 10a. Therefore, the second pole portion layer 10b is formed with more accuracy, compared to the case where the pole portion has a width equal to the recording track width and a length equal to the throat height. Furthermore, according to the embodiment, the second pole portion layer 10b is formed on the first pole portion layer 10a and the insulating layer 12 whose top surfaces are flattened. The second pole portion layer 10b is thus formed with further accuracy in this respect, too. Therefore, according to the embodiment, the track width is defined with accuracy even when the track width is reduced.

If a yoke portion layer is connected to a pole portion having a width equal to the recording track width and a length equal to the throat height, the cross-sectional area of the magnetic path abruptly decreases in the portion connecting the yoke portion layer to the pole portion. As a result, a magnetic flux is saturated in this portion. According to the embodiment, in contrast, the first pole portion layer 10a is connected to the yoke portion layer 18 through the second pole portion layer 10b. In addition, relatively wide areas of the second pole portion layer 10b and the yoke portion layer 18 are in contact with each other since the second pole portion layer 10b is greater than the first pole portion layer 10a in length. Therefore, according to the embodiment, it is impossible that the cross-sectional area of the magnetic path abruptly decreases in the portion connecting the yoke portion layer 18 to the first pole portion layer 10a. As a result, saturation of a magnetic flux halfway through the magnetic path is prevented. According to the embodiment, it is thereby possible to utilize the magnetomotive force generated by the thin-film coil 16 for writing with efficiency.

In this embodiment the end face of the yoke portion layer 18 facing toward the air bearing surface 30 is located at a distance from the air bearing surface 30. As a result, the embodiment prevents 'side write', that is, writing of data in a region of a recording medium where data is not supposed to be written. In the embodiment the first pole portion layer 10a is connected to the yoke portion layer 18 through the second pole portion layer 10b whose entire length is greater than the throat height. Therefore, it is impossible that the cross-sectional area of the magnetic path abruptly decreases even though the end face of the yoke portion layer 18 facing toward the air bearing surface 30 is located at a distance from the air bearing surface 30 as described above.

In the embodiment the thin-film coil 16 is placed on the side of the first pole portion layer 10a and formed on the flat insulating film 15. It is thereby possible to form the thin-film coil 16 into small dimensions with accuracy. Furthermore, according to the embodiment, it is possible that an end of the coil 16 is placed near zero throat height position TH0, that is, near the first pole portion layer 10a, since no apex exists.

As thus described, according to the embodiment, the yoke length of the recording head is reduced by about 30 to 40 percent of that of a prior-art head, for example. Furthermore, a magnetomotive force generated by the thin-film coil 16 is prevented from saturating halfway. It is thereby possible to utilize the magnetomotive force with efficiency. It is therefore possible to provide a thin-film magnetic head having a recording head with an excellent high frequency characteristic, an excellent nonlinear transition shift (NLTS) characteristic and an excellent overwrite property.

According to the embodiment, a reduction in yoke length is achieved. As a result, it is possible to greatly reduce the entire length of the thin-film coil without changing the number of turns of the coil. The resistance of the coil 16 is thereby reduced. It is therefore possible to reduce the thickness of the coil 16.

According to the embodiment, the coil insulating layer 17 is provided to cover the thin-film coil 16 placed on a side of the first pole portion layer 10a and the second pole portion layer 10b of the top pole layer. The top surface of the coil insulating layer 17 is flattened. It is therefore possible to form the yoke portion layer 18 with accuracy.

According to the embodiment, the recording gap layer 9 is provided between the bottom pole layer 8 and the thin-film coil 16. The gap layer 9 is a thin insulating film made of an inorganic material that achieves sufficient insulation strength. High insulation strength is thereby obtained between the bottom pole layer 8 and the coil 16.

In the embodiment the thin-film coil 16 is covered with the coil insulating layer 17 made of an inorganic insulation material. It is thereby possible to prevent the pole portion from protruding toward a recording medium due to expansion resulting from heat generated around the coil 16 when the thin-film magnetic head is used.

Second Embodiment

Figures 12A, 12B:
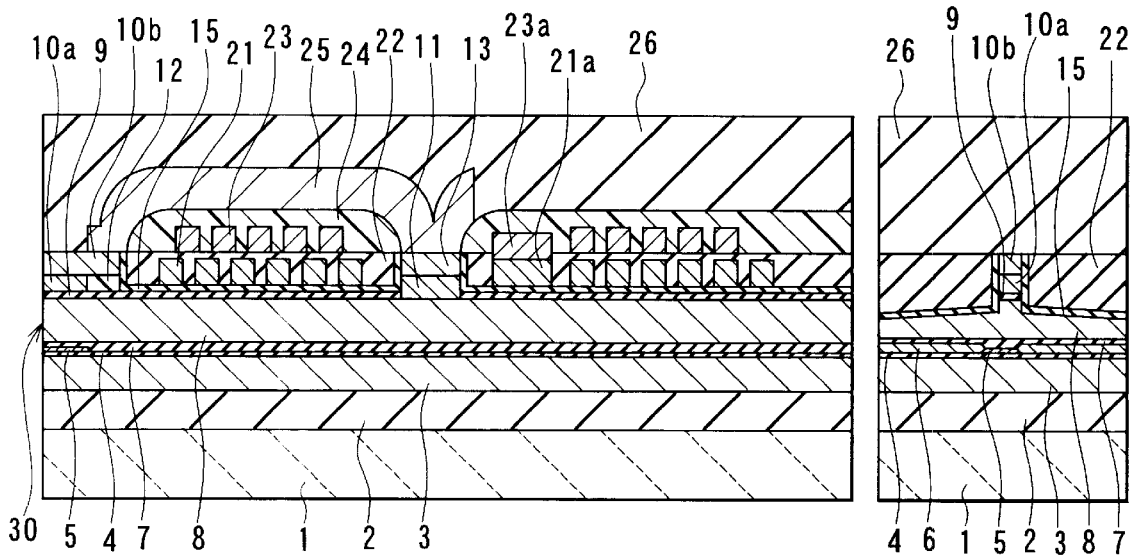
FIG. 12A and FIG. 12B are cross sections of a thin-film magnetic head of a second embodiment of the invention.

Reference is now made to FIG. 12A and FIG. 12B to describe a thin-film magnetic head and a method of manufacturing the same of a second embodiment of the invention. FIG. 12A is a cross section orthogonal to an air bearing surface. FIG. 12B is a cross section of a pole portion parallel to the air bearing surface.

A two-layer thin-film coil is provided in the thin-film magnetic head of the second embodiment. The steps of the method of manufacturing the thin-film magnetic head of the second embodiment that are taken until the bottom pole layer 8 is selectively etched to form the trim structure are similar to those of the first embodiment. In the second embodiment, however, the bottom pole layer 8 is formed in a region wider than that of the first embodiment. In addition, the thickness of the second pole portion layer 10b is about 2.0 to 3.0 μm, for example, in the second embodiment. When the recording gap layer 9 is selectively etched to form the trim structure in this embodiment, a photomask (not shown) for trimming is formed in a region below the thin-film coil before etching is performed, and a portion of the gap layer 9 in the region below the coil is left unremoved.

In the manufacturing method of the second embodiment, after the trim structure is formed, the insulating film 15 of alumina, for example, having a thickness of about 0.3 to 0.5 μm is formed over the entire surface. The insulating film 15 is provided for insulating the thin-film coil described later from the bottom pole layer 8. Next, a first layer 21 of the thin-film coil made of copper, for example, is formed by a method such as frame plating, on the insulating film 15. For example, the thickness of the first layer 21 is about 1.0 to 2.0

μm and the pitch is 1.2 to 2.0 μm. The first layer 21 is wound around the magnetic layers 11 and 13 and a part of the first layer 21 is located on a side of the first pole portion layer 10a. In FIG. 12A numeral 21a indicates a portion for connecting the first layer 21 to a second layer of the coil described later.

Next, a coil insulating layer 22 of alumina, for example, having a thickness of about 3 to 4 μm is formed over the entire surface. The insulating layer 22 is then polished through CMP, for example, so that the second pole portion layer 10b and the magnetic layer 13 are exposed, and the surface is flattened. Although the first layer 21 is not exposed in FIG. 12A, the first layer 21 may be exposed. If the first layer 21 is exposed, an insulating film is formed to cover the first layer 21.

Next, a portion of the coil insulating layer 22 located on the connection portion 21a is etched to form a contact hole. Next, a second layer 23 of the thin-film coil made of copper, for example, is formed by a method such as frame plating on the coil insulating layer 22. For example, the thickness of the second layer 23 is about 1.0 to 2.0 μm and the pitch is 1.2 to 2.0 μm. In FIG. 12A numeral 23a indicates a portion for connecting the second layer 23 to the connection portion 21a of the first layer 21 of the coil through the contact hole.

Next, a photoresist layer 24 is formed into a specific pattern on the coil insulating layer 22 and the second layer 23 of the coil. Next, a yoke portion layer 25 having a thickness of about 2.0 to 3.0 μm is formed to be a yoke portion of the top pole layer on the second pole portion layer 10b, the photoresist layer 24 and the magnetic layer 13. The yoke portion layer 25 may be made of NiFe (80 weight % Ni and 20 weight % Fe), or NiFe (45 weight % Ni and 55 weight % Fe) as a high saturation flux density material and formed into a specific pattern through plating or may be made of a material such as FeN or FeZrN as a high saturation flux density material through sputtering and then selectively etched through ion milling, for example, into the specific pattern. Alternatively, a material such as CoFe or a Co-base amorphous material as a high saturation flux density material may be used. To improve the high frequency characteristic, the yoke portion layer 25 may be made of a number of layers of inorganic insulating films and magnetic layers of Permalloy, for example.

An end face of the yoke portion layer 25 on a side of the air bearing surface 30 is located at a distance of only 0.5 to 1.0 μm, for example, from the air bearing surface 30. In this embodiment, in particular, the end face of the yoke portion layer 25 is located near the zero throat height position.

Next, an overcoat layer 26 of alumina, for example, having a thickness of 20 to 40 μm is formed over the entire surface. The surface of the overcoat layer 26 is then flattened and pads (not shown) for electrodes are formed on the overcoat layer 26. Finally, lapping of the slider is performed to form the air bearing surfaces 30 of the thin-film magnetic head including the recording head and the reproducing head. The thin-film magnetic head of the embodiment is thus completed.

In this embodiment the top pole layer made up of the first pole portion layer 10a, the second pole portion layer 10b, the magnetic layers 11 and 13 and the yoke portion layer 25 corresponds to the second magnetic layer of the invention.

In this embodiment the second layer 23 of the thin-film coil is formed on the flattened coil insulating layer 22. It is thereby possible to form the second layer 23 into small dimensions with accuracy.

The remainder of the configuration, operations and effects of the embodiment are similar to those of the first embodiment.

Third Embodiment

Reference is now made to FIG. 13A to FIG. 18A and FIG. 13B to FIG. 18B to describe a thin-film magnetic head and a method of manufacturing the same of a third embodiment of the invention. FIG. 13A to FIG. 18A are cross sections orthogonal to an air bearing surface. FIG. 13B to FIG. 18B are cross sections of a pole portion parallel to the air bearing surface.

Figures 13A, 13B:
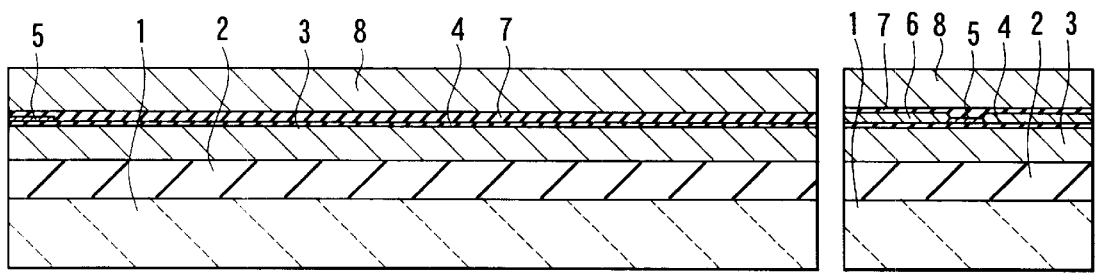
FIG. 13A and FIG. 13B are cross sections for illustrating a step in a method of manufacturing a thin-film magnetic head of a third embodiment of the invention.

A two-layer thin-film coil is provided in the thin-film magnetic head of the third embodiment. As shown in FIG. 13A and FIG. 13B, the steps of the method of manufacturing the thin-film magnetic head of this embodiment that are taken until the bottom pole layer 8 is formed are similar to those of the first embodiment. In the third embodiment, however, the bottom pole layer 8 is formed in a region wider than that of the first embodiment.

Figures 14A, 14B:
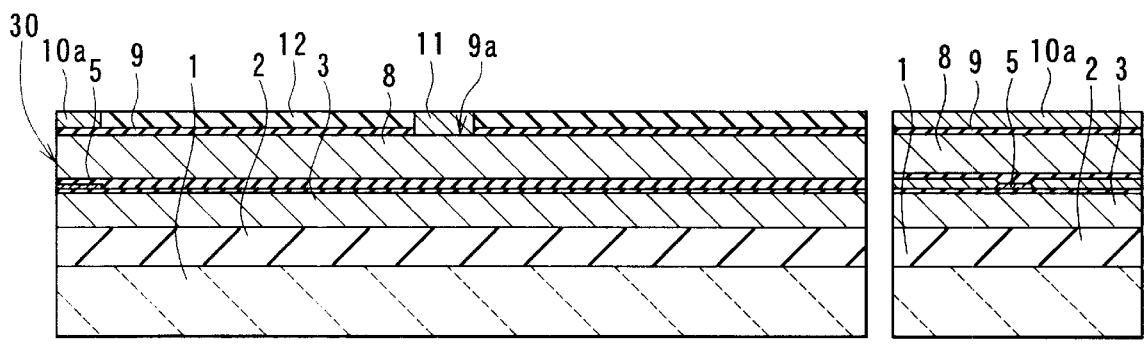
FIG. 14A and FIG. 14B are cross sections for illustrating a step that follows FIG. 13A and FIG. 13B.

In the following step of the third embodiment, as shown in FIG. 14A and FIG. 14B, the recording gap layer 9 made of an insulating material whose thickness is about 0.2 to 0.3 μm, for example, is formed on the bottom pole layer 8. Next, a portion of the recording gap layer 9 is etched to form the contact hole 9a for making the magnetic path. Next, the first pole portion layer 10a of the top pole layer having a thickness of about 0.5 to 1.0 μm, for example, is formed on a portion of the recording gap layer 9 in a neighborhood of an end of the recording gap layer 9 on a side of the air bearing surface 30. At the same time, the magnetic layer 11 made of a magnetic material and having a thickness of about 0.5 to 1.0 μm is formed for making the magnetic path in the contact hole 9a for making the magnetic path. At this point in the manufacturing process, the geometry of the first pole portion layer 10a is similar to that of the first embodiment.

Next, the insulating layer 12 made of alumina, for example, having a thickness of about 1.0 to 2.0 μm is formed over the entire surface. The insulating layer 12 is then polished through CMP, for example, until the first pole portion layer 10a and the magnetic layer 11 are exposed, and the surface is flattened. In FIG. 14A the zero throat height position is the position of the interface between the first pole portion layer 10a and the insulating layer 12.

Figures 15A, 15B:
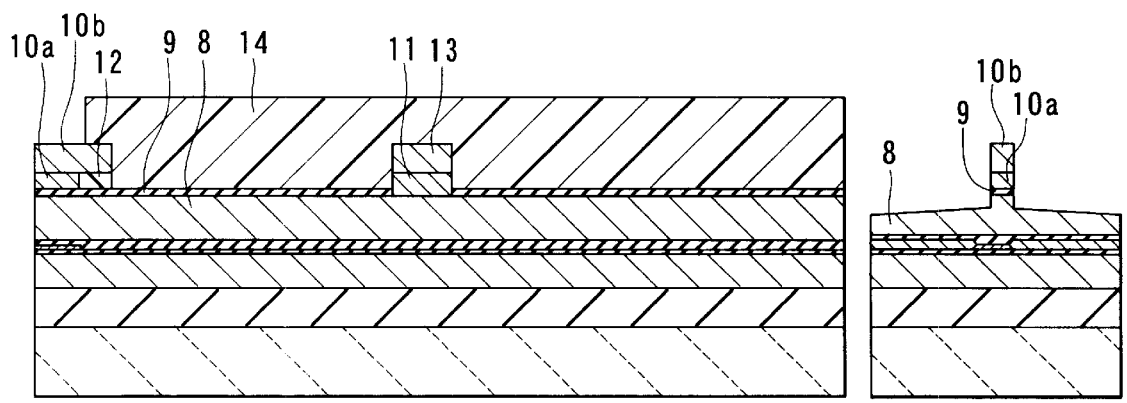
FIG. 15A and FIG. 15B are cross sections for illustrating a step that follows FIG. 14A and FIG. 14B.

Next, as shown in FIG. 15A and FIG. 15B, the second pole portion layer 10b of the top pole layer having a thickness of about 2.0 to 3.0 μm, for example, is formed on the first pole portion layer 10a. At the same time, the magnetic layer 13 having a thickness of about 2.0 to 3.0 μm, for example, is formed on the magnetic layer 11. The width of a portion of the second pole portion layer 10b touching the first pole portion layer 10a is equal to the recording track width. The entire length of the second pole portion layer 10b is greater than the length of a portion of the first pole portion layer 10a to be a part of the pole portion.

Next, the first pole portion layer 10a and the insulating layer 12 are etched through ion milling using an argon-base gas, for example, with the second pole portion layer 10b as a mask. As a result, the width of the portion of the first pole portion layer 10a touching the second pole portion layer 10b is made equal to the width of the second pole portion layer 10b, that is, the recording track width.

Next, a photomask 14 for trimming is formed on a portion other than the region where etching is required for making the trim structure. The recording gap layer 9 is then selectively etched through dry etching, using the first pole portion layer 10a and the second pole portion layer 10b and the photomask 14 as masks. In this step of the embodiment a portion of the gap layer 9 in a region below the thin-film coil described later is left unremoved. The dry etching may be RIE using a chlorine-base gas such as $BCl_2$ or $Cl_2$, or a fluorine-base gas such as $CF_4$ or $SF_6$, for example. Next, the bottom pole layer 8 is selectively etched by about 0.3 to 0.6 µm through ion milling using an argon-base gas, for example. The trim structure as shown in FIG. 15B is thus formed. The photomask 14 is then removed.

Next, as shown in FIG. 16A and FIG. 16B, the insulating film 15 of alumina, for example, having a thickness of about 0.3 to 0.5 µm is formed over the entire surface. Next, a first layer 31 of the thin-film coil made of copper, for example, is formed by a method such as frame plating, on the insulating film 15. For example, the thickness of the first layer 31 is about 1.0 to 2.0 µm and the pitch is 1.2 to 2.0 µm. The first layer 31 is wound around the magnetic layers 11 and 13 and a part of the first layer 31 is located on a side of the first pole portion layer 10a. In FIG. 16A numeral 31a indicates a portion for connecting the first layer 31 to a second layer of the coil described later.

Next, as shown in FIG. 17A and FIG. 17B, a coil insulating layer 32 of alumina, for example, having a thickness of about 3 to 4 µm is formed over the entire surface. The insulating layer 32 is then polished through CMP, for example, so that the second pole portion layer 10b and the magnetic layer 13 are exposed, and the surface is flattened. Although the first layer 31 is not exposed in FIG. 17A, the first layer 31 may be exposed. If the first layer 31 is exposed, an insulating film is formed to cover the first layer 31.

Next, a connection layer 33 made of a magnetic material and having a thickness of about 2.0 to 3.0 µm, for example, is formed on the second pole portion layer 10b and the coil insulating layer 32. The connection layer 33 is provided for connecting the second pole portion layer 10b to a yoke portion layer described later. At the same time, a magnetic layer 34 having a thickness of about 2.0 to 3.0 µm, for example, is formed on the magnetic layer 13.

An end face of the connection layer 33 on a side of the air bearing surface 30 is located at a distance of 0.5 to 1.0 µm only, for example, from the air bearing surface 30. In this embodiment, in particular, the end face of the connection layer 33 is located near the zero throat height position. The connection layer 33 is about 3.0 µm in length, for example. As the distance increases between the air bearing surface 30 and an end face of the connection layer 33 opposite to the air bearing surface 30, the distance increases between the air bearing surface 30 and an end face of the yoke portion layer described later that faces toward the air bearing surface 30. However, the yoke length thereby increases. Therefore, it is preferred that the end face of the connection layer 33 opposite to the air bearing surface 30 is located at a distance from an end face of the second pole portion layer 10b opposite to the air bearing surface 30, toward the side opposite to the air bearing surface 30. The distance is nearly equal to the thickness of the connection layer 33.

The connection layer 33 may be made of NiFe (80 weight % Ni and 20 weight % Fe), or NiFe (45 weight % Ni and 55 weight % Fe) as a high saturation flux density material and formed into a specific pattern through plating or may be made of a material such as FeN or FeZrN as a high saturation flux density material through sputtering and then selectively etched through ion milling, for example, into the specific pattern. Alternatively, a material such as CoFe or a Co-base amorphous material as a high saturation flux density material may be used.

Next, an insulating film 35 of alumina, for example, having a thickness of about 0.3 to 0.5 µm is formed over the entire surface. Next, portions of the insulating film 35 and the coil insulating layer 32 located on the connection portion 31a is etched to form a contact hole. Next, a second layer 36 of the thin-film coil made of copper, for example, is formed by a method such as frame plating on the insulating film 35. For example, the thickness of the second layer 36 is about 1.0 to 2.0 µm and the pitch is 1.2 to 2.0 µm. The second layer 36 is wound around the magnetic layer 34 and a part of the layer 36 is located on a side of the connection layer 33. In FIG. 17A numeral 36a indicates a portion for connecting the second layer 36 of the coil to the connection portion 31a of the first layer 31 through the contact hole.

Figures 18A, 18B:
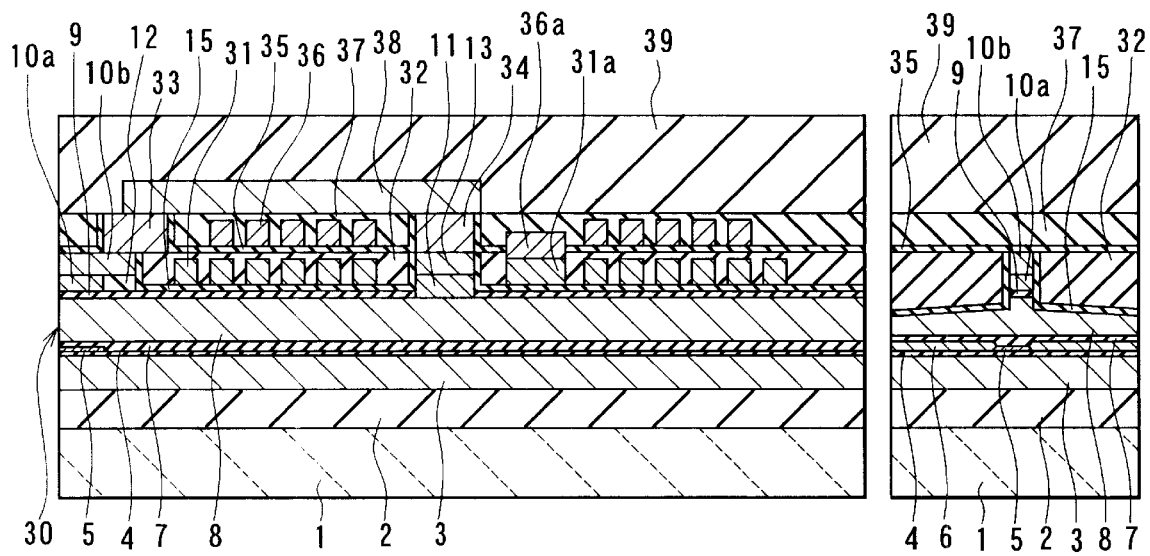
FIG. 18A and FIG. 18B are cross sections of the thin-film magnetic head of the third embodiment.

Next, as shown in FIG. 18A and FIG. 18B, a coil insulating layer 37 of alumina, for example, having a thickness of about 3 to 4 µm, for example, is formed over the entire surface. The insulating layer 37 is then polished through CMP, for example, so that the connection layer 33 and the magnetic layer 34 are exposed, and the surface is flattened. Although the second layer 36 is not exposed in FIG. 18A, the second layer 36 may be exposed. If the second layer 36 is exposed, an insulating film is formed to cover the second layer 36.

Next, the yoke portion layer 38 having a thickness of about 2.0 to 3.0 µm, for example, is formed to be a yoke portion of the top pole layer on the connection layer 33, the coil insulating layer 37 and the magnetic layer 34. The material and method of making the yoke portion layer 38 are similar to those of the yoke portion layer 18 of the first embodiment.

An end face of the yoke portion layer 38 on a side of the air bearing surface 30 is located at a distance from the air bearing surface 30. In this embodiment, in particular, the end face of the yoke portion layer 38 is located farther from the air bearing surface 30 than the zero throat height position.

Next, an overcoat layer 39 of alumina, for example, having a thickness of 20 to 40 µm is formed over the entire surface. The surface of the overcoat layer 39 is then flattened and pads (not shown) for electrodes are formed on the overcoat layer 39. Finally, lapping of the slider is performed to form the air bearing surfaces 30 of the thin-film magnetic head including the recording head and the reproducing head. The thin-film magnetic head of the embodiment is thus completed.

In this embodiment the second pole portion layer 10b is connected to the yoke portion layer 38 through the connection layer 33. In the embodiment the top pole layer made up of the first pole portion layer 10a, the second pole portion layer 10b, the connection layer 33, the magnetic layers 11, 13 and 34 and the yoke portion layer 38 corresponds to the second magnetic layer of the invention.

In this embodiment the first layer 31 of the thin-film coil is located on the side of the first pole portion layer 10a of the top pole layer, and formed on the flat insulating film 15. The second layer 36 of the thin-film coil is located on the side of the connection layer 33, and formed on the flat insulating film 35. It is thereby possible to form the first layer 31 and the second layer 36 of the coil into small dimensions with accuracy. A reduction in yoke length is thus achieved.

According to the embodiment, the coil insulating layer 37 is provided to cover the second layer 36 of the thin-film coil placed on a side of the connection layer 33. The top surface of the coil insulating layer 37 is flattened. It is therefore possible to form the yoke portion layer 38 with accuracy.

The remainder of the configuration, operations and effects of the embodiment are similar to those of the first embodiment.

Fourth Embodiment

Reference is now made to FIG. 19A to FIG. 24A and FIG. 19B to FIG. 24B to describe a thin-film magnetic head and a method of manufacturing the same of a fourth embodiment of the invention. FIG. 19A to FIG. 24A are cross sections orthogonal to an air bearing surface. FIG. 19B to FIG. 24B are cross sections of a pole portion parallel to the air bearing surface.

A two-layer thin-film coil is provided in the thin-film magnetic head of the fourth embodiment. The steps of the method of manufacturing the thin-film magnetic head of this embodiment that are taken until the recording gap layer 9 is formed are similar to those of the third embodiment.

Figures 19A, 19B:
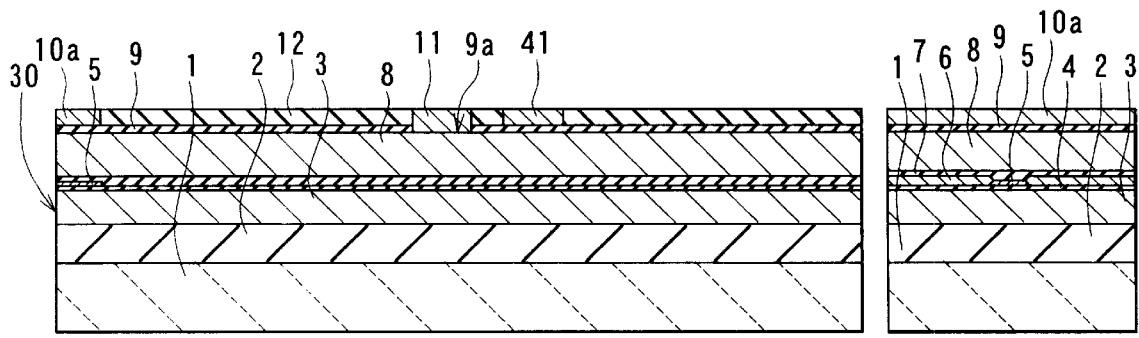
FIG. 19A and FIG. 19B are cross sections for illustrating a step in a method of manufacturing a thin-film magnetic head of a fourth embodiment of the invention.

In the following step of the fourth embodiment, as shown in FIG. 19A and FIG. 19B, a portion of the recording gap layer 9 is etched to form the contact hole 9a for making the magnetic path. Next, the first pole portion layer 10a of the top pole layer having a thickness of about 0.5 to 1.0 µm, for example, is formed on a portion of the recording gap layer 9 in a neighborhood of an end of the recording gap layer 9 on a side of the air bearing surface 30. At the same time, the magnetic layer 11 made of a magnetic material and having a thickness of about 0.5 to 1.0 µm, for example, is formed for making the magnetic path in the contact hole 9a for making the magnetic path. At this point in the manufacturing process, the geometry of the first pole portion layer 10a is similar to that of the first embodiment.

In this embodiment a raised pattern 41 having a thickness of about 0.5 to 1.0 µm, for example, is formed on the recording gap layer 9 in a region where a portion for connecting a first layer of the thin-film coil to a second layer described later is to be located. Although a material of the pattern 41 is not particularly specified, it is preferred that the first pole portion layer 10a and the magnetic layer 11 of the top pole layer and the pattern 41 are made of the same magnetic material, and the pattern 41 is formed at the same time as the first pole portion layer 10a and the magnetic layer 11 are formed.

Next, the insulating layer 12 made of alumina, for example, having a thickness of about 1.0 to 2.0 µm is formed over the entire surface. The insulating layer 12 is then polished through CMP, for example, until the first pole portion layer 10a, the magnetic layer 11 and the raised pattern 41 are exposed, and the surface is flattened. In FIG. 19A the zero throat height position is the position of the interface between the first pole portion layer 10a and the insulating layer 12.

Next, as shown in FIG. 20A and FIG. 20B, the second pole portion layer 10b of the top pole layer having a thickness of about 2.0 to 3.0 µm, for example, is formed on the first pole portion layer 10a. At the same time, the magnetic layer 13 having a thickness of about 2.0 to 3.0 µm is formed on the magnetic layer 11. The width of a portion of the second pole portion layer 10b touching the first pole portion layer 10a is equal to the recording track width. The entire length of the second pole portion layer 10b is greater than the length of a portion of the first pole portion layer 10a to be a part of the pole portion.

Next, the first pole portion layer 10a and the insulating layer 12 are etched through ion milling using an argon-base gas, for example, with the second pole portion layer 10b as a mask. As a result, the width of the portion of the first pole portion layer 10a touching the second pole portion layer 10b is made equal to the width of the second pole portion layer 10b, that is, the recording track width.

Next, as shown in FIG. 21A and FIG. 21B, the photomask 14 for trimming is formed on a portion other than the region where etching is required for making the trim structure. The recording gap layer 9 is then selectively etched through dry etching, using the first pole portion layer 10a and the second pole portion layer 10b and the photomask 14 as masks. In this step of the embodiment a portion of the gap layer 9 in a region below the thin-film coil described later is left unremoved. The dry etching may be RIE using a chlorine-base gas such as $BCl_2$ or $Cl_2$, or a fluorine-base gas such as $CF_4$ or $SF_6$, for example. Next, the bottom pole layer 8 is selectively etched by about 0.3 to 0.6 µm through ion milling using an argon-base gas, for example. The trim structure as shown in FIG. 21B is thus formed. The photomask 14 is then removed.

Next, as shown in FIG. 22A and FIG. 22B, the first layer 31 of the thin-film coil made of copper, for example, is formed by a method such as frame plating, on the recording gap layer 9. For example, the thickness of the first layer 31 is about 1.0 to 2.0 µm and the pitch is 1.2 to 2.0 µm. The first layer 31 is wound around the magnetic layers 11 and 13 and a part of the first layer 31 is located on a side of the first pole portion layer 10a. In this embodiment a portion 31a for connecting the first layer 31 to a second layer of the coil described later is formed on the raised pattern 41.

Next, as shown in FIG. 23A and FIG. 23B, the coil insulating layer 32 of alumina, for example, having a thickness of about 3 to 4 µm is formed over the entire surface. The insulating layer 32 is then polished through CMP, for example, so that the second pole portion layer 10b, the magnetic layer 13 and the connection portion 31a are exposed, and the surface is flattened. Although the first layer 31 is not exposed in FIG. 23A, the first layer 31 may be exposed. If the first layer 31 is exposed, an insulating film is formed to cover the first layer 31.

Next, the connection layer 33 made of a magnetic material and having a thickness of about 2.0 to 3.0 µm, for example, is formed on the second pole portion layer 10b and the coil insulating layer 32. The connection layer 33 is provided for connecting the second pole portion layer 10b to a yoke portion layer described later. At the same time, the magnetic layer 34 having a thickness of about 2.0 to 3.0 µm, for example, is formed on the magnetic layer 13. The material, dimensions and arrangement of the connection layer 33 are similar to those of the third embodiment.

Next, the second layer 36 of the thin-film coil made of copper, for example, is formed by a method such as frame plating on the coil insulating layer 32. For example, the thickness of the second layer 36 is about 1.0 to 2.0 µm and the pitch is 1.2 to 2.0 µm. The second layer 36 is wound around the magnetic layer 34 and a part of the layer 36 is located on a side of the connection layer 33. The connection portion 36a of the second layer 36 is formed on the connection portion 31a of the first layer 31.

Figures 24A, 24B:
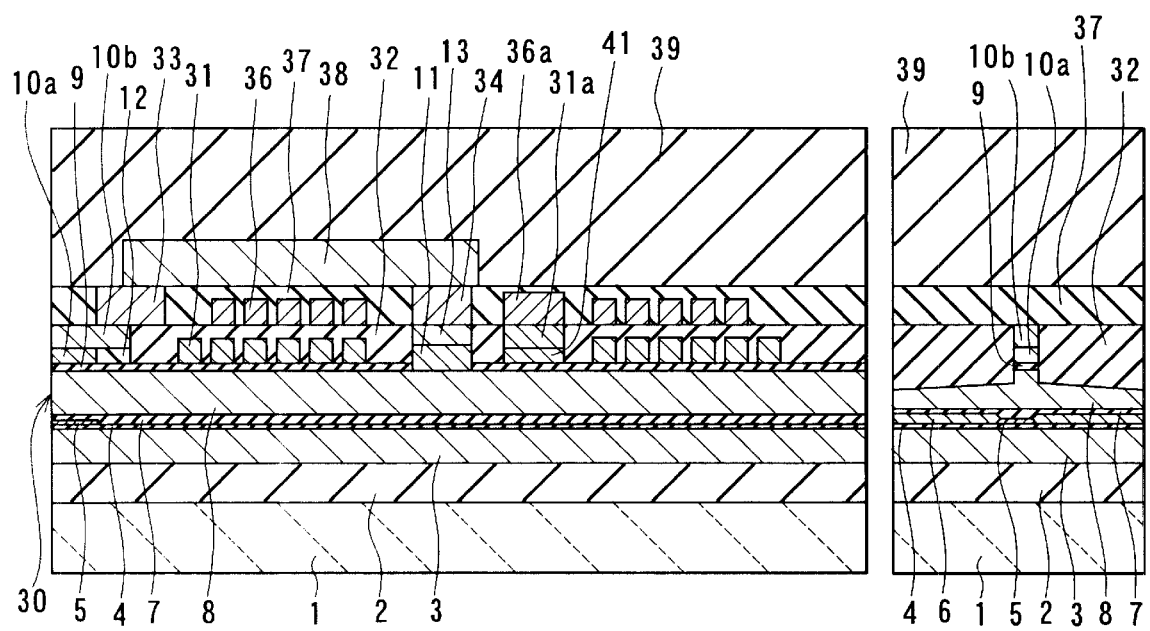
FIG. 24A and FIG. 24B are cross sections of the thin-film magnetic head of the fourth embodiment.
Figure 25A:
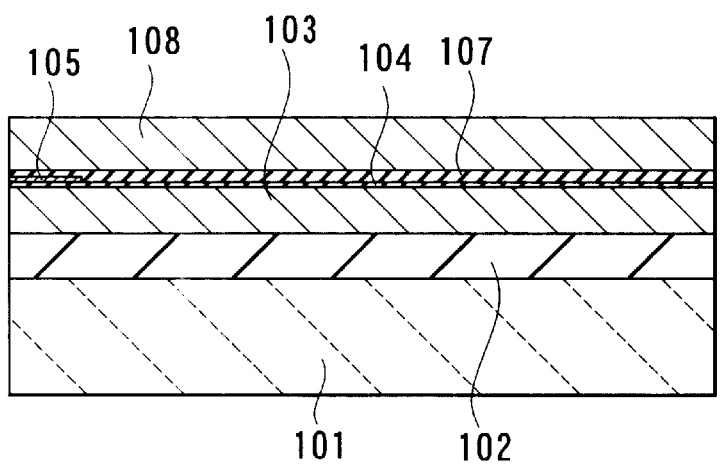
FIG. 25A and FIG. 25B are cross sections for illustrating a step in a method of manufacturing a thin-film magnetic head of related art.
Figure 25B:
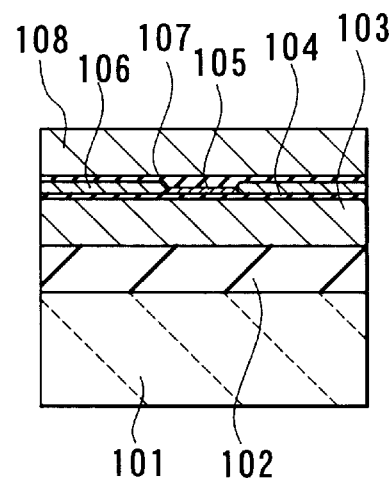
Figure 26A:
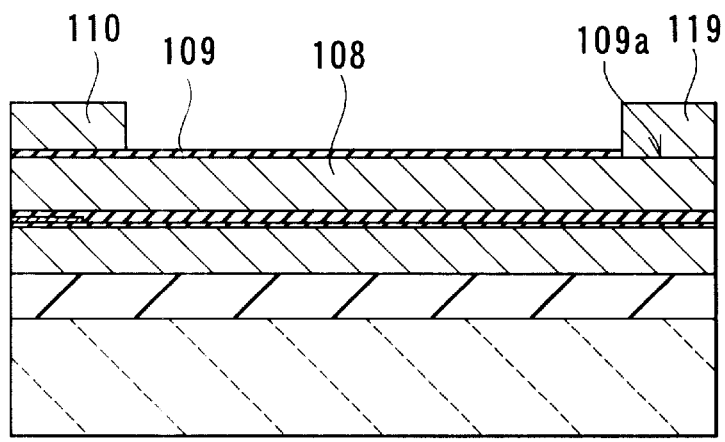
FIG. 26A and FIG. 26B are cross sections for illustrating a step that follows FIG. 25A and FIG. 25B.
Figure 26B:
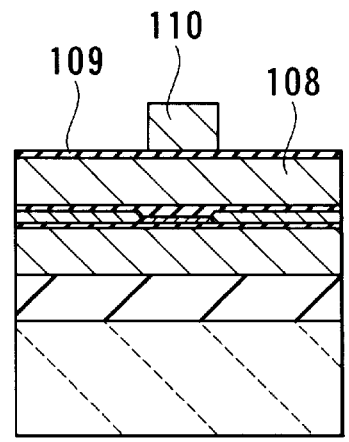
Figures 27A, 27B:
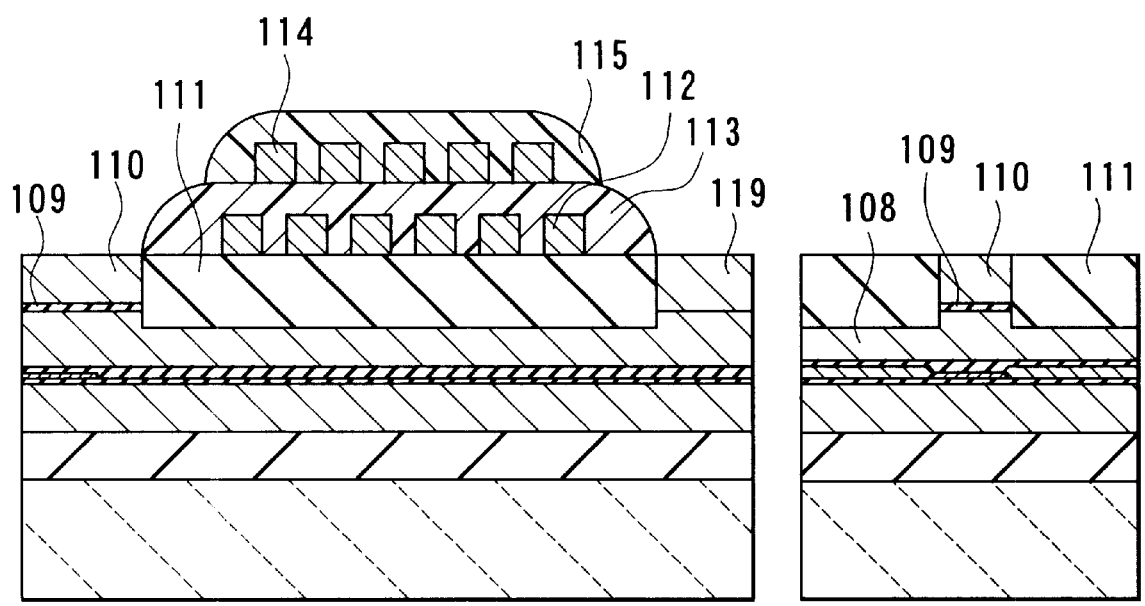
FIG. 27A and FIG. 27B are cross sections for illustrating a step that follows FIG. 26A and FIG. 26B.
Figure 29:
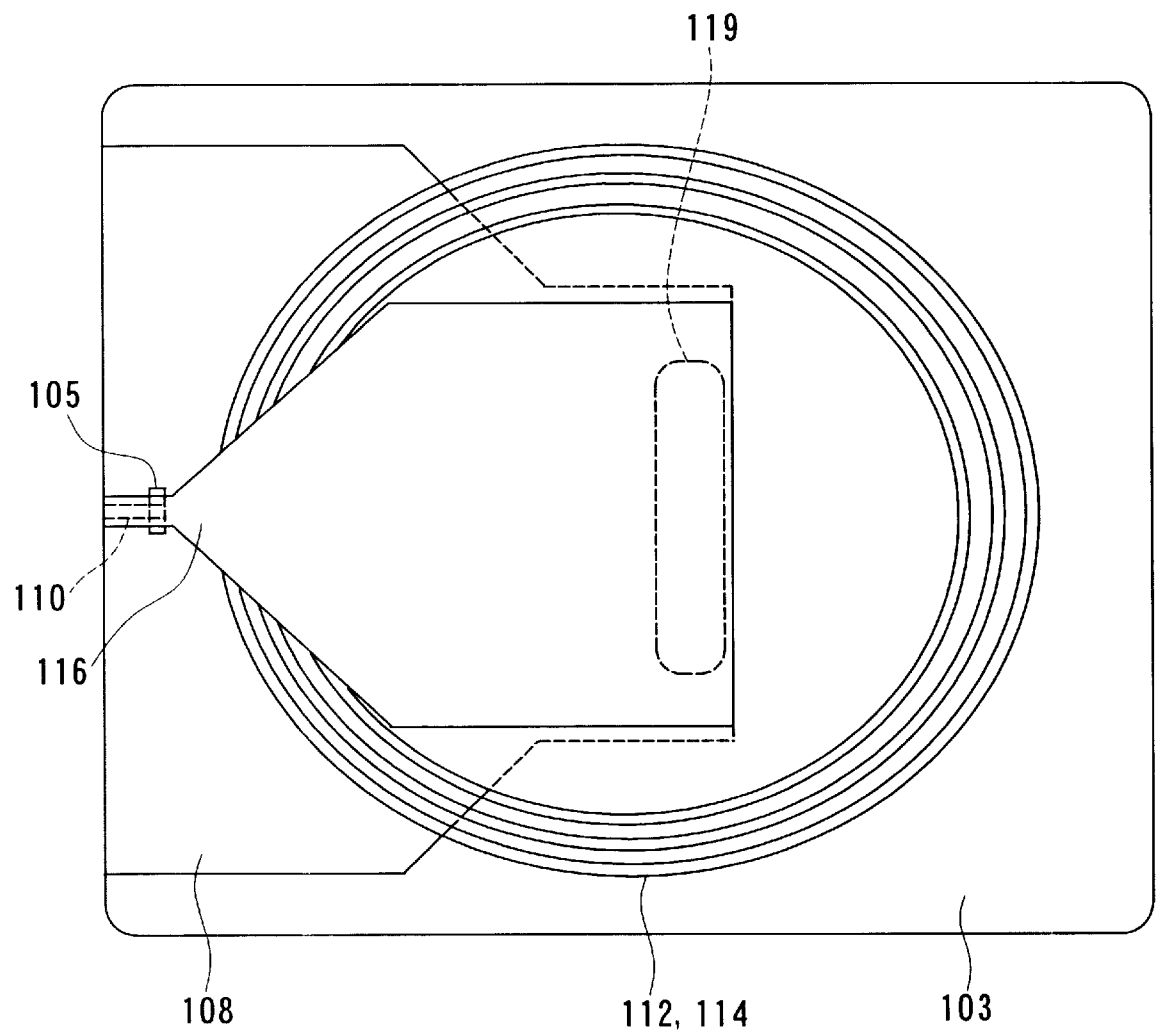
FIG. 29 is a top view of the related-art thin-film magnetic head.

Next, as shown in FIG. 24A and FIG. 24B, the coil insulating layer 37 of alumina, for example, having a thickness of about 3 to 4 µm is formed over the entire surface. The insulating layer 37 is then polished through CMP, for example, so that the connection layer 33 and the magnetic layer 34 are exposed, and the surface is flattened. Although the second layer 36 of the coil is not exposed in FIG. 24A, the second layer 36 may be exposed. If the second layer 36 is exposed, an insulating film is formed to cover the second layer 36.

Next, the yoke portion layer 38 having a thickness of about 2.0 to 3.0 µm is formed to be a yoke portion of the top pole layer on the connection layer 33, the coil insulating layer 37 and the magnetic layer 34. The material and method of making the yoke portion layer 38 are similar to those of the yoke portion layer 18 of the first embodiment.

An end face of the yoke portion layer 38 on a side of the air bearing surface 30 is located at a distance from the air bearing surface 30. In this embodiment, in particular, the end face of the yoke portion layer 38 is located farther from the air bearing surface 30 than the zero throat height position.

Next, the overcoat layer 39 of alumina, for example, having a thickness of 20 to 40 μm, for example, is formed over the entire surface. The surface of the overcoat layer 39 is then flattened and pads (not shown) for electrodes are formed on the overcoat layer 39. Finally, lapping of the slider is performed to form the air bearing surfaces 30 of the thin-film magnetic head including the recording head and the reproducing head. The thin-film magnetic head of the embodiment is thus completed.

In this embodiment the raised pattern 41 is formed on the recording gap layer 9 in a region where the portion 31a for connecting the first layer 31 to the second layer 36 of the coil is located. The connection portion 31a is then formed on the raised pattern 41. As a result, in the step of polishing the coil insulating layer 32 through CMP, for example, to flatten the surface, not only the second pole portion layer 10b and the magnetic layer 13 but also the connection portion 31a is exposed. Therefore, this embodiment does not require the step of forming a contact hole in a portion of the coil insulating layer 32 on top of the portion 31a in order to connect the portion 31a of the first layer 31 of the coil to the portion 36a of the second layer 36. In addition, no extra step is required for making the raised pattern 41 if the pattern 41 is formed at the same time as the first pole portion layer 10a and the magnetic layer 11 of the top pole layer.

The remainder of the configuration, operations and effects of the fourth embodiment are similar to those of the third embodiment.

The present invention is not limited to the foregoing embodiments but may be practiced in still other ways. In the foregoing embodiments, for example, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

The invention may be applied to a thin-film magnetic head dedicated to writing that has an induction-type magnetic transducer only or to a thin-film magnetic head performing writing and reading through an induction-type magnetic transducer.

According to the thin-film magnetic head of the invention described so far, the first pole portion layer of one of the magnetic layer has a length equal to the throat height. In addition, each of the first and second pole portion layers of this magnetic layer has a width equal to the recording track width. As a result, it is possible to make the width of the first pole portion layer equal to the recording track width after the second pole portion layer is formed. Therefore, according to the invention, it is possible that the first pole portion layer is first formed to have a width greater than the recording track width, and the first pole portion layer is thereby formed with accuracy. Furthermore, according to the invention, the entire length of the second pole portion layer is greater than the length of the first pole portion layer. The second pole portion layer is therefore formed with accuracy. Due to those features of the invention, it is possible to define the track width and the throat height with accuracy even if the track width of the induction-type magnetic transducer is reduced. Furthermore, according to the invention, the first pole portion layer is connected to the yoke portion layer through the second pole portion layer, and the regions of the second pole portion layer and the yoke portion layer touching each other are relatively large since the length of the second pole portion layer is greater than the length of the first pole portion layer. Therefore, the invention prevents an abrupt decrease in the cross-sectional area of the magnetic path in the portion connecting the yoke portion layer to the first pole portion layer. A magnetic flux is thereby prevented from saturating halfway through the magnetic path.

In the thin-film magnetic head of the invention, the end face of the yoke portion layer facing toward a recording medium may be located at a distance from the surface of the head facing toward the medium. In this case, it is possible to prevent writing of data in a region of the recording medium where data is not supposed to be written.

The thin-film magnetic head of the invention may comprise the insulating layer located on a side of the first pole portion layer. A surface of the insulating layer facing the second pole portion layer is flattened, together with a surface of the first pole portion layer. In this case, the second pole portion layer is formed with further accuracy.

In the invention at least a part of the thin-film coil may be placed on a side of the first pole portion layer that defines the throat height. In this case, an end of the at least part of the coil is located near an end of the first pole portion layer. The yoke length is thereby reduced.

The thin-film magnetic head of the invention may further comprise the coil insulating layer that covers at least part of the thin-film coil located on a side of the first pole portion layer. A surface of the coil insulating layer facing the yoke portion layer is flattened, together with a surface of the second pole portion layer. In this case, it is further possible to form the layer adjacent to the insulating layer with accuracy.

The thin-film magnetic head of the invention may have the following configuration. The thin-film coil has: the first portion located on a side of the first pole portion layer; and the second portion located between the first portion and the yoke portion layer. In addition, the head further comprises the coil insulating layer that covers the first portion of the coil located on the side of the first pole portion layer. A surface of the coil insulating layer facing the yoke portion layer is flattened, together with a surface of the second pole portion layer. In addition, the second portion of the coil is placed between the coil insulating layer and the yoke portion layer. In this case, it is further possible to form the second portion of the coil with accuracy.

The thin-film magnetic head of the invention may have the following configuration. One of the magnetic layers further has the connection layer for connecting the second pole portion layer to the yoke portion layer. The thin-film coil has: the first portion located on a side of the first pole portion layer; and the second portion located on a side of the connection layer. In addition, the head further comprises the first and second coil insulating layers. The first coil insulating layer covers the first portion of the coil located on the side of the first pole portion layer. A surface of the first coil insulating layer facing the yoke portion layer is flattened, together with a surface of the second pole portion layer. The second coil insulating layer covers the second portion of the coil located on the side of the connection layer. A surface of the second coil insulating layer facing the yoke portion layer is flattened, together with a surface of the connection layer facing the yoke portion layer. In this case, it is further possible to form the yoke portion layer with accuracy.

In the method of manufacturing a thin-film magnetic head of the invention, the step of forming the second magnetic layer includes the steps of: forming the first pole portion layer, a portion of the first pole portion layer to be a part of the pole portion having a length equal to the throat height; forming the second pole portion layer, the width of a portion of the second pole portion layer that touches the first pole portion layer being equal to the recording track width, the entire length of the second pole portion layer being greater than the length of the portion of the first pole portion layer to be the part of the pole portion; etching the first pole portion layer through the use of the second pole portion layer as a mask, such that portions of the first and second pole portion layers touching each other are equal in width; and forming the yoke portion layer. Therefore, according to the invention, it is possible that the first pole portion layer is first formed to have a width greater than the recording track width, and the first pole portion layer is thereby formed with accuracy. Furthermore, according to the invention, the entire length of the second pole portion layer is greater than the length of the first pole portion layer. The second pole portion layer is therefore formed with accuracy. Due to those features of the invention, it is possible to define the track width and the throat height with accuracy even if the track width of the induction-type magnetic transducer is reduced. Furthermore, according to the invention, the first pole portion layer is connected to the yoke portion layer through the second pole portion layer, and the regions of the second pole portion layer and the yoke portion layer touching each other are relatively large since the length of the second pole portion layer is greater than the length of the first pole portion layer. Therefore, the invention prevents an abrupt decrease in the cross-sectional area of the magnetic path in the portion connecting the yoke portion layer to the first pole portion layer. A magnetic flux is thereby prevented from saturating halfway through the magnetic path.

In the method of manufacturing a thin-film magnetic head of the invention, the end face of the yoke portion layer facing toward a recording medium may be located at a distance from the surface of the head facing toward the medium. In this case, it is possible to prevent writing of data in a region of the recording medium where data is not supposed to be written.

The method of the invention may further include the step of forming the insulating layer located on a side of the first pole portion layer. A surface of the insulating layer facing the second pole portion layer is flattened, together with a surface of the first pole portion layer. In this case, the second pole portion layer is formed with further accuracy.

In the method of the invention at least part of the thin-film coil may be placed on a side of the first pole portion layer. In this case, an end of the at least a part of the coil is located near an end of the first pole portion layer. The yoke length is thereby reduced.

The method of the invention may further include the step of forming the coil insulating layer that covers at least part of the thin-film coil located on a side of the first pole portion layer. A surface of the coil insulating layer facing the yoke portion layer is flattened, together with a surface of the second pole portion layer. In this case, it is further possible to form the layer adjacent to the insulating layer with accuracy.

In the method of the invention, the coil insulating layer may be formed. The coil insulating layer covers the first portion of the coil located on the side of the first pole portion layer. A surface of the coil insulating layer facing the yoke portion layer is flattened, together with the other surface of the second pole portion layer. In addition, the second portion of the coil may be placed between the coil insulating layer and the yoke portion layer. In this case, it is further possible to form the second portion of the coil with accuracy.

In the method of the invention the connection layer may be provided for connecting the second pole portion layer to the yoke portion layer, the first portion of the coil may be placed on a side of the first pole portion layer, and the second portion of the coil may be placed on a side of the connection layer. In addition, the method may further include the step of forming the first coil insulating layer that covers the first portion of the coil located on the side of the first pole portion layer. A surface of the first coil insulating layer facing the yoke portion layer is flattened, together with a surface of the second pole portion layer. The method may further include the step of forming second coil insulating layer that covers the second portion of the coil located on the side of the connection layer. A surface of the second coil insulating layer facing the yoke portion layer is flattened, together with a surface of the connection layer facing the yoke portion layer. In this case, it is further possible to form the yoke portion layer with accuracy.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; wherein one of the magnetic layers includes:

a first pole portion layer forming a part of one of the pole portions and having a width equal to a recording track width and a length equal to a throat height, a surface of the first pole portion layer being adjacent to the gap layer;

a second pole portion layer including another part of the one of the pole portions, a surface of the second pole portion layer touching the other surface of the first pole portion layer, an entire length of the second pole portion layer being greater than the length of the first pole portion layer;

the second pole portion layer having a portion that is laid over the first pole portion layer, the portion of the second pole portion layer and the first pole portion layer being equal in width along the entire thicknesses thereof;

the one of the magnetic layers further including a yoke portion layer forming a yoke portion and connected directly or indirectly to the other surface of the second pole portion layer.

2. The thin-film magnetic head according to claim 1 wherein an end face of the yoke portion layer that faces toward the medium facing surface is located at a distance from the medium facing surface.

3. The thin-film magnetic head according to claim 1, further comprising an insulating layer located on a side of the first pole portion layer, a surface of the insulating layer that faces the second pole portion layer being flattened, together with the other surface of the first pole portion layer.

4. The thin-film magnetic head according to claim 1 wherein the at least part of the coil is placed on a side of the first pole portion layer.

5. The thin-film magnetic head according to claim 4, further comprising a coil insulating layer that covers the at least part of the coil located on the side of the first pole portion layer, a surface of the coil insulating layer that faces the yoke portion layer being flattened, together with the other surface of the second pole portion layer.

6. The thin-film magnetic head according to claim 1 wherein the thin-film coil includes: a first portion located on a side of the first pole portion layer; and a second portion located between the first portion and the yoke portion layer.

7. The thin-film magnetic head according to claim 6, further comprising a coil insulating layer that covers the first portion of the coil located on the side of the first pole portion layer, a surface of the coil insulating layer that faces the yoke portion layer being flattened, together with the other surface of the second pole portion layer, the second portion of the coil being located between the coil insulating layer and the yoke portion layer.

8. The thin-film magnetic head according to claim 1 wherein the one of the magnetic layers further includes a connection layer for connecting the second pole portion layer to the yoke portion layer.

9. The thin-film magnetic head according to claim 8 wherein the thin-film coil includes: a first portion located on a side of the first pole portion layer; and a second portion located on a side of the connection layer.

10. The thin-film magnetic head according to claim 9, further comprising: a first coil insulating layer that covers the first portion of the coil located on the side of the first pole portion layer, a surface of the first coil insulating layer that faces the yoke portion layer being flattened, together with the other surface of the second pole portion layer; and a second coil insulating layer that covers the second portion of the coil located on the side of the connection layer, a surface of the second coil insulating layer that faces the yoke portion layer being flattened, together with a surface of the connection layer that faces the yoke portion layer.

11. The thin-film magnetic head according to claim 1 wherein: the first pole portion layer is made of a high saturation flux density material; and a value obtained through dividing a thickness of the first pole portion layer by the width thereof is 0.5 or greater.

12. The thin-film magnetic head according to claim 1, further comprising: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

13. A method of manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; the method including the steps of:

forming the first magnetic layer;

forming the gap layer on the first magnetic layer;

forming the second magnetic layer on the gap layer; and forming the coil such that the at least part of the coil is placed between the first and second magnetic layers, the at least part of the coil being insulated from the first and second magnetic layers; wherein:

the step of forming the second magnetic layer includes the steps of:

forming a first pole portion layer including a portion to be a part of one of the pole portions, the portion of the first pole portion layer to be the part of the one of the pole portions having a length equal to a throat height, a surface of the first pole portion layer being adjacent to the gap layer;

forming a second pole portion layer including another part of the one of the pole portions, a surface of the second pole portion layer touching the other surface of the first pole portion layer, an entire length of the second pole portion layer being greater than the length of the portion of the first pole portion layer to be the part of the one of the pole portions, the second pole portion layer having a portion that is laid over the first pole portion layer, the portion of the second pole portion layer having a width equal to a recording track width;

etching the first pole portion layer through the use of the second pole portion layer as a mask, such that the portion of the second pole portion layer and the first pole portion layer are made equal in width along the entire thicknesses thereof; and forming a yoke portion layer making up a yoke portion and connected directly or indirectly to the other surface of the second pole portion layer.

14. The method according to claim 13 wherein an end face of the yoke portion layer that faces toward the medium facing surface is located at a distance from the medium facing surface in the step of forming the yoke portion layer.

15. The method according to claim 13, further including the step of forming an insulating layer located on a side of the first pole portion layer, a surface of the insulating layer that faces the second pole portion layer being flattened, together with the other surface of the first pole portion layer.

16. The method according to claim 13 wherein the at least part of the coil is placed on a side of the first pole portion layer in the step of forming the coil.

17. The method according to claim 16, further including the step of forming a coil insulating layer that covers the at least part of the coil located on the side of the first pole portion layer, a surface of the coil insulating layer that faces the yoke portion layer being flattened, together with the other surface of the second pole portion layer.

18. The method according to claim 13 wherein the step of forming the thin-film coil includes formation of: a first portion located on a side of the first pole portion layer; and a second portion located between the first portion and the yoke portion layer.

19. The method according to claim 18, further including the step of forming a coil insulating layer that covers the first portion of the coil located on the side of the first pole portion layer, a surface of the coil insulating layer that faces the yoke portion layer being flattened, together with the other surface of the second pole portion layer, wherein the second portion of the coil is located between the coil insulating layer and the yoke portion layer in the step of forming the coil.

20. The method according to claim 13 wherein the step of forming the second magnetic layer further includes the step of forming a connection layer for connecting the second pole portion layer to the yoke portion layer.

21. The method according to claim 20 wherein the step of forming the thin-film coil includes formation of: a first portion located on a side of the first pole portion layer; and a second portion located on a side of the connection layer.

22. The method according to claim 21, further including the steps of: forming a first coil insulating layer that covers the first portion of the coil located on the side of the first pole portion layer, a surface of the first coil insulating layer that faces the yoke portion layer being flattened, together with the other surface of the second pole portion layer; and forming a second coil insulating layer that covers the second portion of the coil located on the side of the connection layer, a surface of the second coil insulating layer that faces the yoke portion layer being flattened, together with a surface of the connection layer that faces the yoke portion layer.

23. The method according to claim 13 wherein the first pole portion layer is etched through reactive ion etching in the step of etching.

24. The method according to claim 23 wherein a mask pattern is formed on the second pole portion layer and the second pole portion layer is etched through reactive ion etching with the mask pattern as a mask, and the first pole portion layer is then etched through reactive ion etching with the mask pattern and the second pole portion layer as masks in the step of etching.

25. The method according to claim 24, further including the step of etching a portion of the first magnetic layer through reactive ion etching with the mask pattern and the second pole portion layer as masks after the first pole portion layer is etched.

26. The method according to claim 13 wherein the second pole portion layer is formed through plating.

27. The method according to claim 26 wherein the first pole portion layer is etched through reactive ion etching with the second pole portion layer as a mask in the step of etching.

28. The method according to claim 27, further including the step of etching a portion of the first magnetic layer through reactive ion etching with the second pole portion layer as a mask after the first pole portion layer is etched.

29. The method according to claim 27 wherein: the first pole portion layer is made of a high saturation flux density material; and the first pole portion layer is formed such that a value obtained through dividing a thickness of the first pole portion layer by the width thereof is 0.5 or greater.

30. The method according to claim 27 wherein a gas of $Cl_2$ or $BCl_3$ is used for the reactive ion etching in the step of etching the first pole portion layer.

31. The method according to claim 27 wherein the reactive ion etching is performed at a temperature in a range between 50 and 300° C. inclusive in the step of etching the first pole portion layer.

32. The method according to claim 13, further including the step of forming: a magnetoresistive element; a first shield layer and a second shield layer for shielding the magnetoresistive element, portions of the first and second shield layers located in regions on a side of the medium facing surface being opposed to each other, the magnetoresistive element being placed between the portions of the shield layers; and a first insulating film placed between the magnetoresistive element and the first shield layer, and a second insulating film placed between the magnetoresistive element and the second shield layer.

33. The method according to claim 32 wherein at least one of the first and second insulating films is formed through chemical vapor deposition.

* * * * *